United States Patent
Martz et al.

(10) Patent No.: US 9,446,894 B2
(45) Date of Patent: Sep. 20, 2016

(54) VALVE FOR PRESSURIZED CONTAINER

(71) Applicant: Clayton Corporation, Fenton, MO (US)

(72) Inventors: Kevin Robert Martz, Desoto, MO (US); James P. McBroom, Byrnes Mill, MO (US)

(73) Assignee: Clayton Corporation, Fenton, MO (US)

( * ) Notice: Subject to any disclaimer, the term of this patent is extended or adjusted under 35 U.S.C. 154(b) by 0 days.

(21) Appl. No.: 14/797,521

(22) Filed: Jul. 13, 2015

(65) Prior Publication Data

US 2016/0009482 A1 Jan. 14, 2016

Related U.S. Application Data

(60) Provisional application No. 62/158,300, filed on May 7, 2015, provisional application No. 62/024,231, filed on Jul. 14, 2014.

(51) Int. Cl.

| | |
|---|---|
| *B65D 83/48* | (2006.01) |
| *F16K 1/30* | (2006.01) |
| *F16K 27/02* | (2006.01) |
| *F16K 31/58* | (2006.01) |
| *B65D 83/38* | (2006.01) |
| *B65D 83/46* | (2006.01) |

(52) U.S. Cl.
CPC ............... *B65D 83/48* (2013.01); *B65D 83/38* (2013.01); *B65D 83/46* (2013.01); *F16K 1/308* (2013.01); *F16K 27/02* (2013.01); *F16K 31/58* (2013.01)

(58) Field of Classification Search
CPC ...... B65D 83/48; B65D 83/46; B65D 83/38; F16K 27/02; F16K 1/308; F16K 31/58
USPC ................ 251/325, 354; 222/402.21–402.22
See application file for complete search history.

(56) References Cited

U.S. PATENT DOCUMENTS

| | | | |
|---|---|---|---|
| 2,703,665 A | * | 3/1955 | Soffer .................... B65D 83/46 222/402.11 |
| 2,704,172 A | | 3/1955 | Lapin |
| 3,048,307 A | | 8/1962 | Michel |
| 3,101,875 A | | 8/1963 | Michel |
| 3,450,316 A | | 6/1969 | Barker |

(Continued)

FOREIGN PATENT DOCUMENTS

| | | |
|---|---|---|
| DE | 20 2008 011 805 U1 | 12/2008 |
| DE | 20 2008 000 699 U1 | 7/2009 |

(Continued)

OTHER PUBLICATIONS

International Search Report and Written Opinion for PCT Application No. PCT/IB2015/055294 dated Sep. 24, 2015, 12 pages, Rijswijk, NL.

*Primary Examiner* — John Bastianelli
(74) *Attorney, Agent, or Firm* — Senniger Powers LLP

(57) ABSTRACT

A valve for dispensing a flowable product from a container includes a mounting cup. The mounting cup includes a bottom wall having a central portion defining a seal-mounting opening through which a seal and a stem extend. An external seal bead of the seal overlies an upper end of the central portion. The upper end of the central portion is disposed at or below a plane extending transverse to a central axis of the mounting cup and defined by a juncture of a sidewall and an annular sidewall-bottom transition portion of the mounting cup.

16 Claims, 31 Drawing Sheets

(56) References Cited

U.S. PATENT DOCUMENTS

| | | | |
|---|---|---|---|
| 3,583,608 A | 6/1971 | Green | |
| 3,627,179 A * | 12/1971 | Scheindel | B65D 83/48 222/402.21 |
| 3,647,120 A | 3/1972 | Steiman | |
| 3,791,561 A | 2/1974 | Ewald | |
| 3,918,611 A | 11/1975 | Ewald | |
| 4,171,074 A * | 10/1979 | Diamond | B65D 83/46 222/402.22 |
| 4,765,516 A | 8/1988 | Metcoff et al. | |
| 4,824,075 A | 4/1989 | Holzboog | |
| 4,832,236 A | 5/1989 | Greaves | |
| 4,887,743 A | 12/1989 | Blake | |
| 4,911,336 A | 3/1990 | Blake | |
| 5,016,785 A | 5/1991 | Greenbaum, II | |
| 5,035,106 A | 7/1991 | Haase | |
| 5,167,347 A | 12/1992 | Wiegner et al. | |
| 5,289,944 A | 3/1994 | Wiegner et al. | |
| 5,553,755 A | 9/1996 | Bonewald et al. | |
| 5,785,301 A | 7/1998 | Scheindel | |
| 6,058,960 A * | 5/2000 | Kopp | B65D 83/48 137/68.11 |
| 6,817,494 B2 | 11/2004 | Lilienthal | |
| 7,168,684 B2 | 1/2007 | Marroncles et al. | |
| 8,074,848 B2 | 12/2011 | Pittl et al. | |
| 8,235,244 B2 | 8/2012 | Bulso | |
| 8,505,765 B2 | 8/2013 | Bulso | |
| 8,905,273 B2 | 12/2014 | de Schrijver | |
| 2013/0200111 A1 | 8/2013 | De Schrijver et al. | |
| 2014/0048567 A1 | 2/2014 | Dhaenens et al. | |
| 2014/0048568 A1 | 2/2014 | Demey et al. | |
| 2015/0014990 A1 | 1/2015 | Bodet et al. | |

FOREIGN PATENT DOCUMENTS

| | | |
|---|---|---|
| EP | 1524206 B1 | 3/2009 |
| WO | 8101130 A1 | 4/1981 |
| WO | 2011095499 A1 | 8/2011 |
| WO | 2011124520 A1 | 10/2011 |
| WO | 2014206999 A1 | 12/2014 |

* cited by examiner

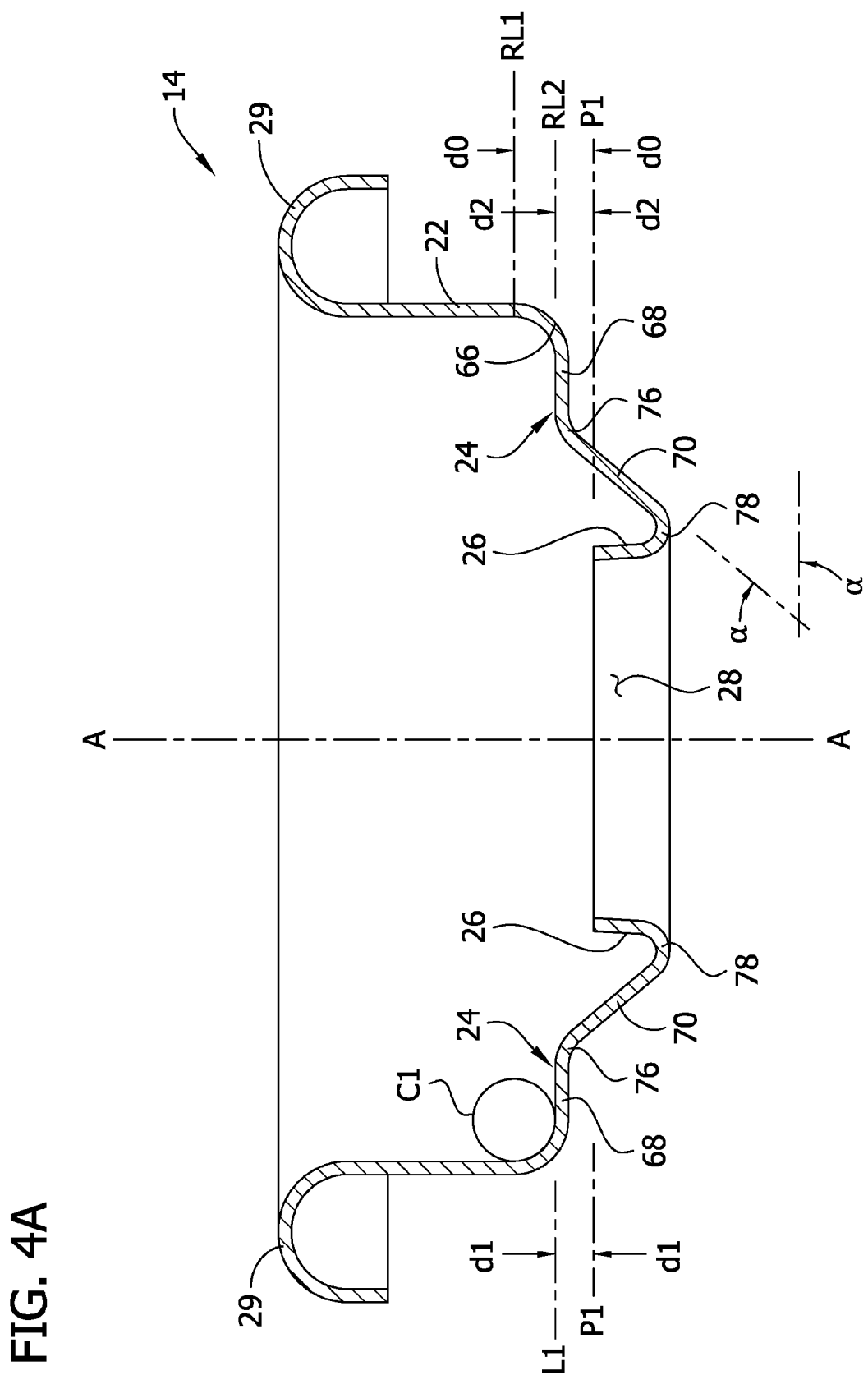

VALVE FOR PRESSURIZED CONTAINER

FIELD OF THE DISCLOSURE

The present disclosure generally relates to a valve for dispensing a flowable product from a pressurized container.

BACKGROUND OF THE DISCLOSURE

Valves for pressurized containers (e.g., aerosol containers) are well known. One well known valve includes a mounting cup, a stem, and a seal (e.g., a grommet) disposed between and interconnecting the stem and the mounting cup. The mounting cup has a generally cylindrical sidewall, a generally flat bottom wall, and an upper curled lip at an upper end of the sidewall. A central portion extends upward from a central region of the bottom wall and defines a mounting opening through which the seal and the stem extend. The mounting cup is received in an opening on top of the container, and the mounting cup is crimped (clinched) or otherwise attached to the container. The seal is made of a resilient material and has an elongate neck which extends through the mounting opening. A seal bead extends radially outward from the neck and overlies and presses against an upper peripheral edge of the central portion to secure the seal to the mounting cup. The stem includes an elongate tubular stem body with an outlet and inlet(s) (orifices) at the upper and lower ends, respectively, and a disc (or button) at the lower end of the stem body. The stem body snugly fits through a bore defined by the seal to form a seal therebetween. The disc seats against a seat portion of the seal to form a leak proof seal when the valve is in a non-actuated position. The disc is movable away from the seat portion in an actuated position to allow product in the container, via pressure inside the container, to flow between the disc and the seat portion and through inlet(s) of the stem. Depending on the actuator used to operate the valve, the valve may function as a "vertically actuated" valve, whereby an axial force is applied to the stem to unseat the disc from the seat portion of the seal, or alternatively, as a "tilt" valve, whereby a rotational force is applied to the side of the stem to unseat the disc.

In some situations, such as when the valve is attached to an aerosol container containing a flowable product and the container is attached to a device for applying the flowable product, the device may damage the external seal bead during attachment of the device to the container including the valve. This may cause leakage, and ultimately, failure of the valve. For example, dispensing guns are used to facilitate dispensing of products, such as moisture curable one component polyurethane foam (OCF), from a container including a vertically actuated valve as described above. Typically, a gun collar (gun ring) is snap-fitted, or otherwise attached, to the valve which had been previously attached to a container, and then threaded onto, or otherwise attached to, the gun basket of a dispensing gun. As the container, with the attached valve and collar, is threaded onto the gun basket, a hub of the gun basket receives an upper end portion of the stem and seal, and a shoulder of the hub engages a shoulder of the stem to drive axial movement of the stem and unseat the stem disc from the seat portion of the seal. With conventional valves in this example, there exist conditions under which the external seal bead is pinched between the gun basket and the upper peripheral edge of the central portion of the mounting cup as a result of 1) the design of the gun basket and/or 2) the distance the gun collar allows the container to be threaded onto the gun basket. This may lead to two problems: 1) the upper peripheral edge of the central portion may damage the external bead, and even cut the external bead from the seal, in which case, there would be nothing preventing the stem and seal from being pushed into the container, causing leakage; and 2) free axial movement of the stem inside the seal has ceased, and the stem and the seal move as one, causing the seal to move axially away from the mounting cup, causing leakage between the mounting cup and the seal.

SUMMARY

In one aspect, a valve for dispensing a flowable product from a container generally comprises a stem including a stem body defining a passage therein, and a disc at a lower portion of the stem body. A seal is attached to the stem body. The seal includes a neck surrounding at least a longitudinal portion of the stem body, and an external seal bead extending laterally outward from the neck. A mounting cup is configured to mount the valve to the container. The mounting cup includes an annular sidewall having upper and lower ends and defining a central axis of the mounting cup, a bottom wall extending radially inward from adjacent the lower end of the sidewall toward the central axis of the mounting cup, and an annular sidewall-bottom transition portion interposed between the lower end of the sidewall and an outer peripheral edge of the bottom wall. The bottom wall has a central portion defining a seal-mounting opening through which the seal and the stem extend. The external seal bead overlies an upper end of the central portion. The upper end of the central portion is disposed at or below a plane extending transverse to the central axis of the mounting cup and defined by a juncture of the sidewall and the annular sidewall-bottom transition portion.

In another aspect, a valve for dispensing flowable product from a container generally comprises a stem including a stem body defining a passage therein, and a disc at a lower portion of the stem body; a seal attached to the stem body, the seal including a neck surrounding at least a longitudinal portion of the stem body, and an external seal bead extending laterally outward from the neck; and a mounting cup configured to mount the valve to the container, the mounting cup including an annular sidewall having upper and lower ends and defining a central axis of the mounting cup, a bottom wall extending radially inward from adjacent the lower end of the sidewall toward the central axis of the mounting cup, an annular sidewall-bottom transition portion interposed between the lower end of the sidewall and an outer peripheral edge of the bottom wall, the annular sidewall-bottom transition portion having a radius and being bounded by an upper radius line defining an upper radius line plane transverse to the central axis and a lower radius line defining a lower radius line plane transverse to the central axis. The bottom wall has a central portion defining a seal-mounting opening through which the seal and the stem extend, the external seal bead overlying an upper end of the central portion. In one embodiment, the upper end of the central portion is disposed at or below a location that is about 0.040 in (1.016 mm) above the lower radius line plane. In another embodiment, the upper end of the central portion is disposed at or below the upper radius line plane. In yet another embodiment, the upper end of the central portion is disposed at or below the lower radius line plane. In any of these aforementioned embodiments, the bottom wall may have a radial portion extending downward and being curved downwardly such that the radial portion has a convex shape as viewed from the bottom. In any of these aforementioned embodiments, and in particular the mounting cup with the convex bottom wall, the mounting cup may be formed from sheet metal (e.g., steel sheet metal) having a thickness of less than 0.016 in (0.406 mm) and greater than or equal to 0.005 in (0.127 mm), e.g., 0.010 in (0.254 mm) such that the mounting cup resists deformation and does not significantly deform in use under a pressure of at least about 180 psi (e.g., when attached to an aerosol can that is pressurized to an internal pressure from about 180 psi to about 195 psi).

In yet another aspect, a valve for dispensing flowable product from a container generally comprises a stem including a stem body defining a passage therein, and a disc at a lower portion of the stem body; a seal attached to the stem body, the seal including a neck surrounding at least a longitudinal portion of the stem body, and an external seal bead extending laterally outward from the neck; and a mounting cup configured to mount the valve to the container, the mounting cup including an annular sidewall having upper and lower ends and defining a central axis of the mounting cup, a bottom wall extending radially inward from adjacent the lower end of the sidewall toward the central axis of the mounting cup, an annular sidewall-bottom transition portion interposed between the lower end of the sidewall and an outer peripheral edge of the bottom wall. The bottom wall has a radial portion extending downward and being curved downwardly such that the radial portion has a convex shape as viewed from the bottom.

Other features will be in part apparent and in part pointed out hereinafter.

BRIEF DESCRIPTION OF THE DRAWINGS

FIG. 4A is a cross section of the mounting cup;

Corresponding reference characters indicate corresponding parts throughout the drawings.

DETAILED DESCRIPTION OF THE DISCLOSURE

Figure 1:
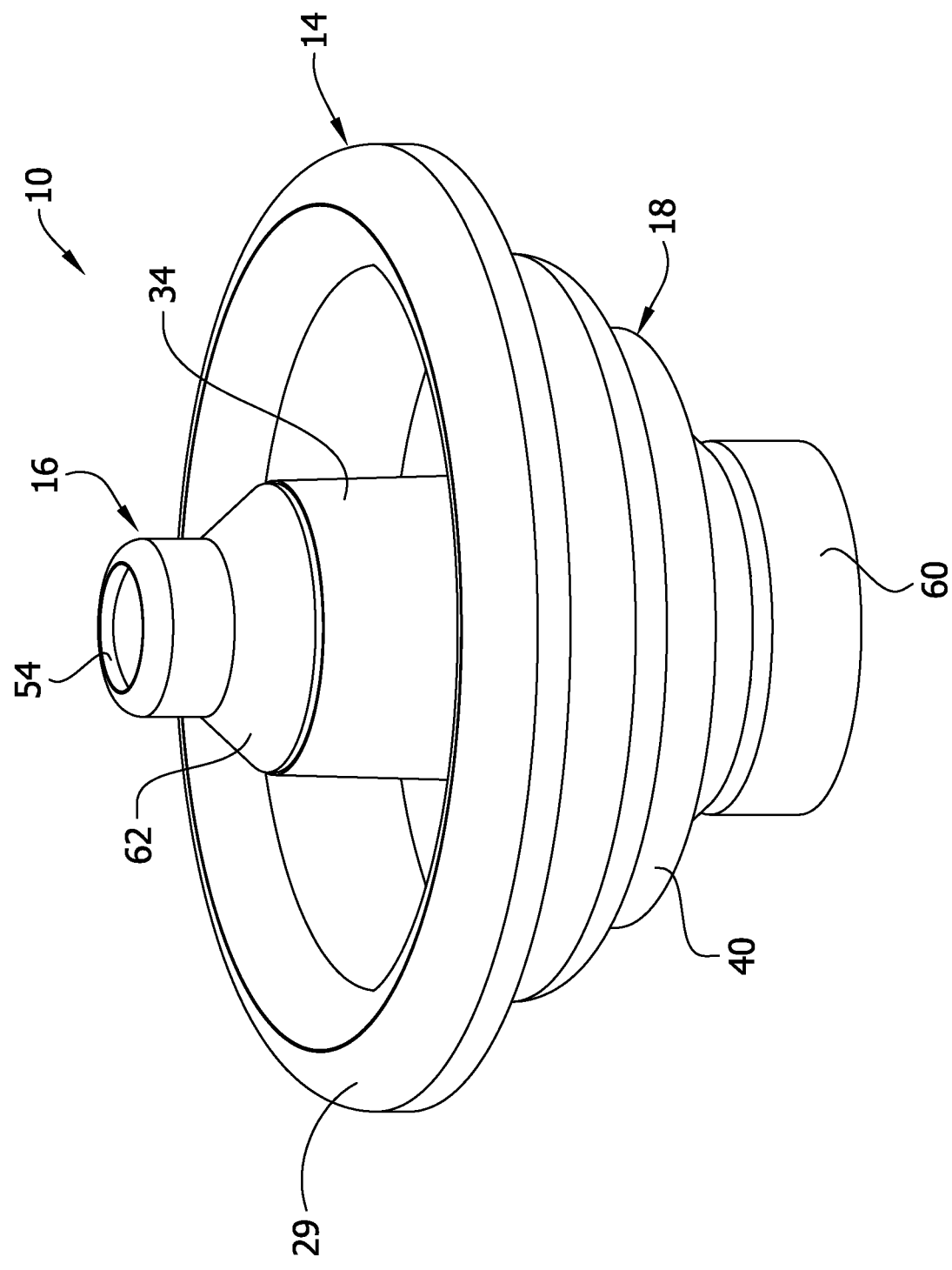
FIG. 1 is a perspective of an embodiment of a valve for dispensing a flowable product from a pressurized container.
Figure 2:
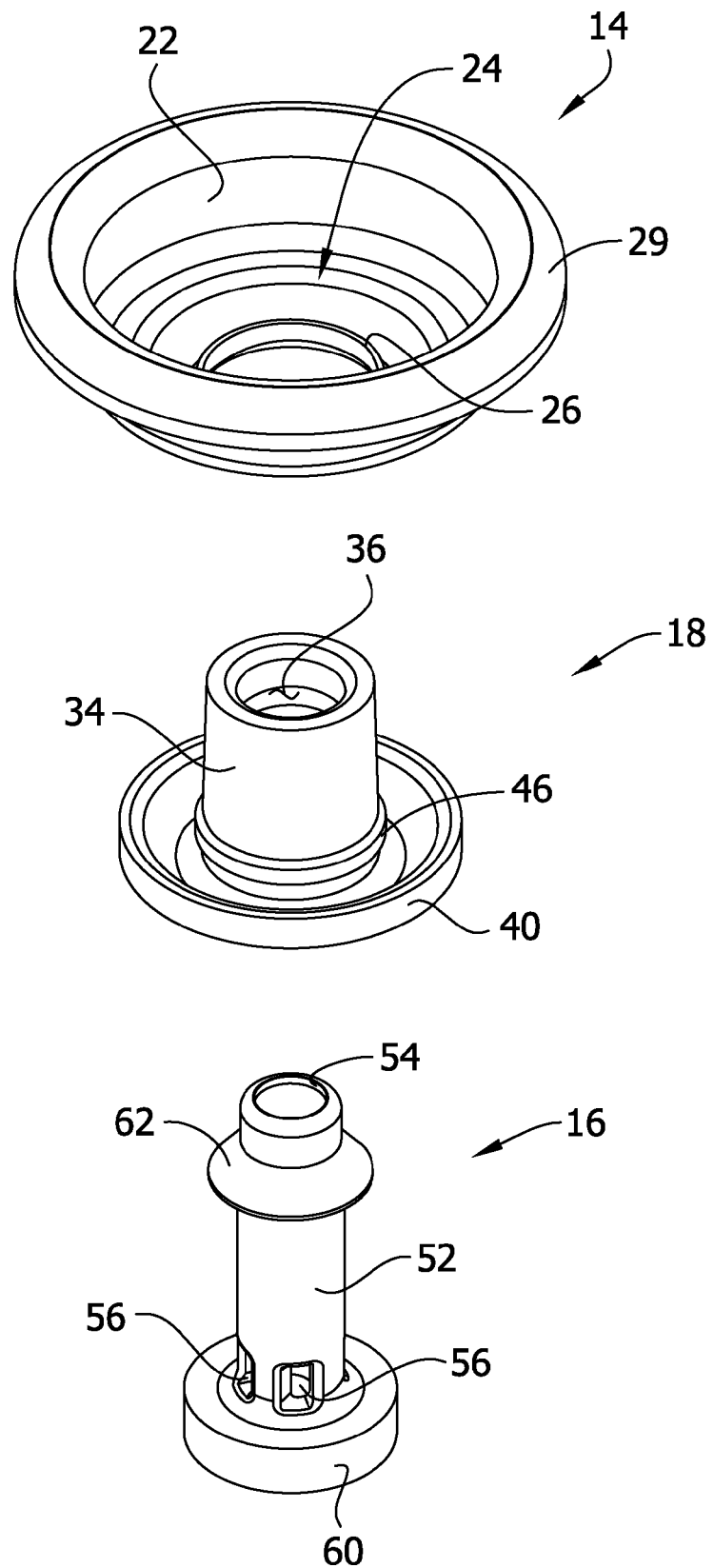
FIG. 2 is an exploded view of the valve showing a mounting cup, a seal, and a stem of the valve.
Figure 3:
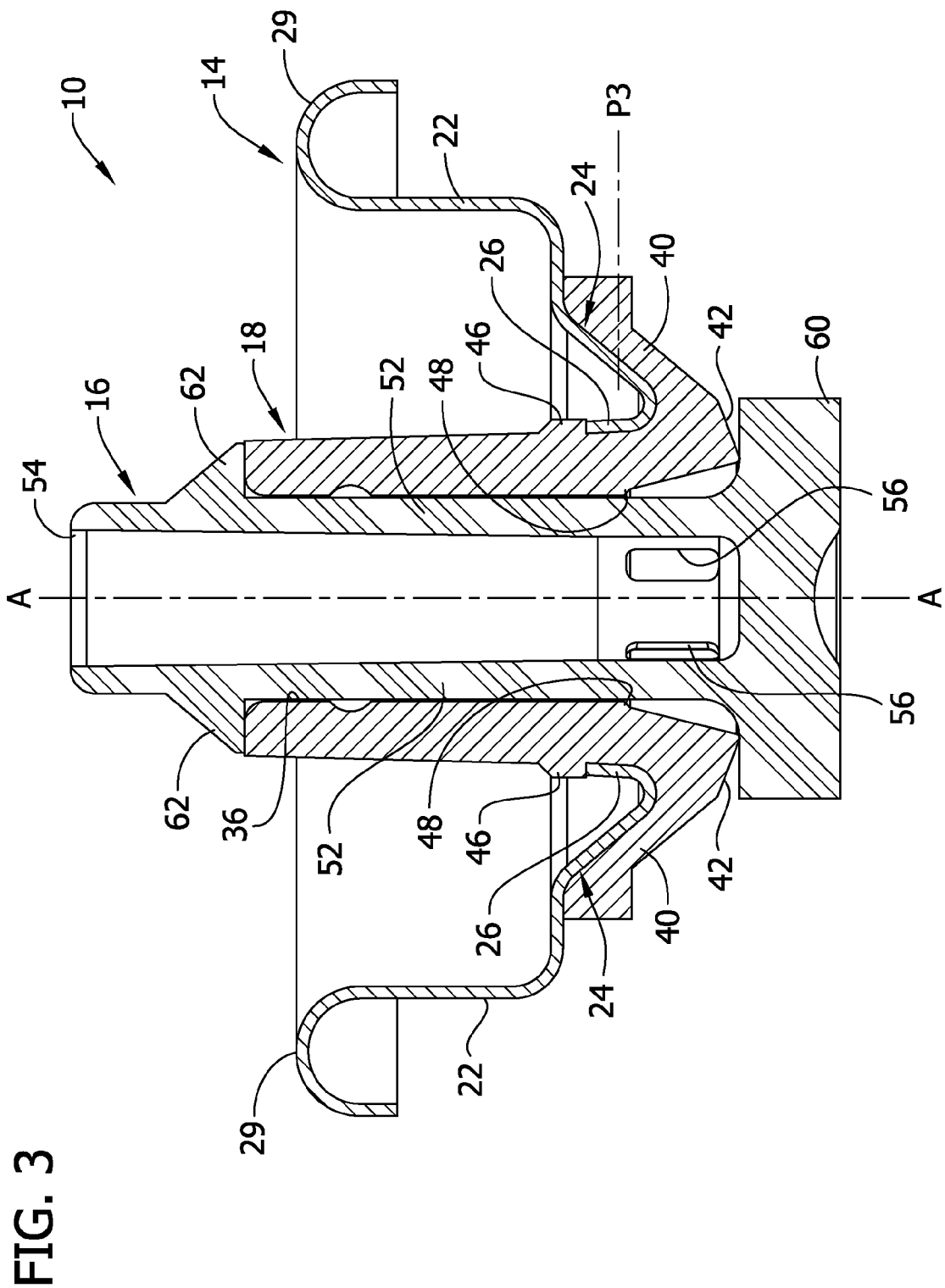
FIG. 3 is a cross section of the valve.
Figure 6:
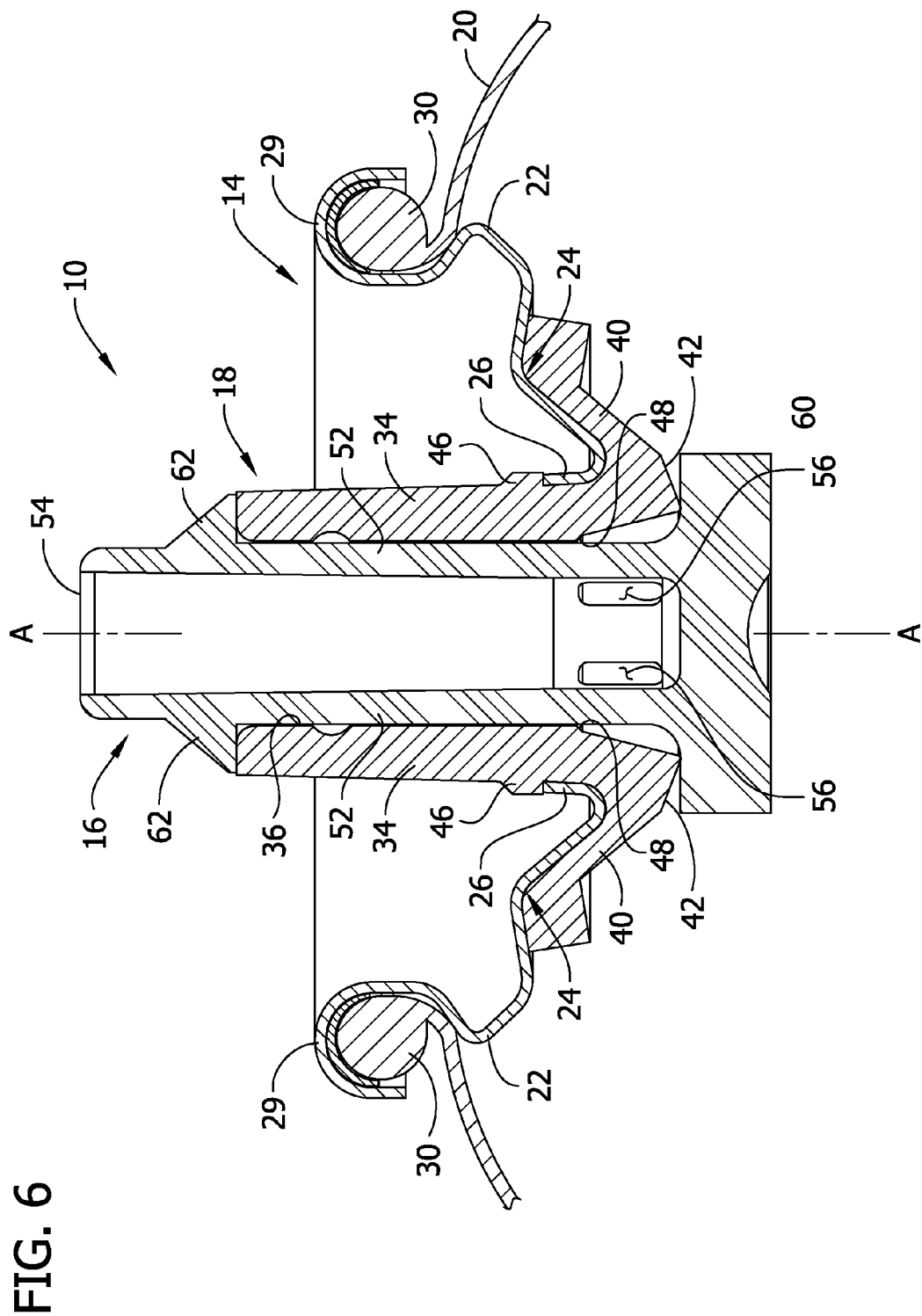
FIG. 6 is a cross section of a container assembly including the valve and a pressurized container to which the valve is attached, the pressurized container being shown partially.
Figure 7:
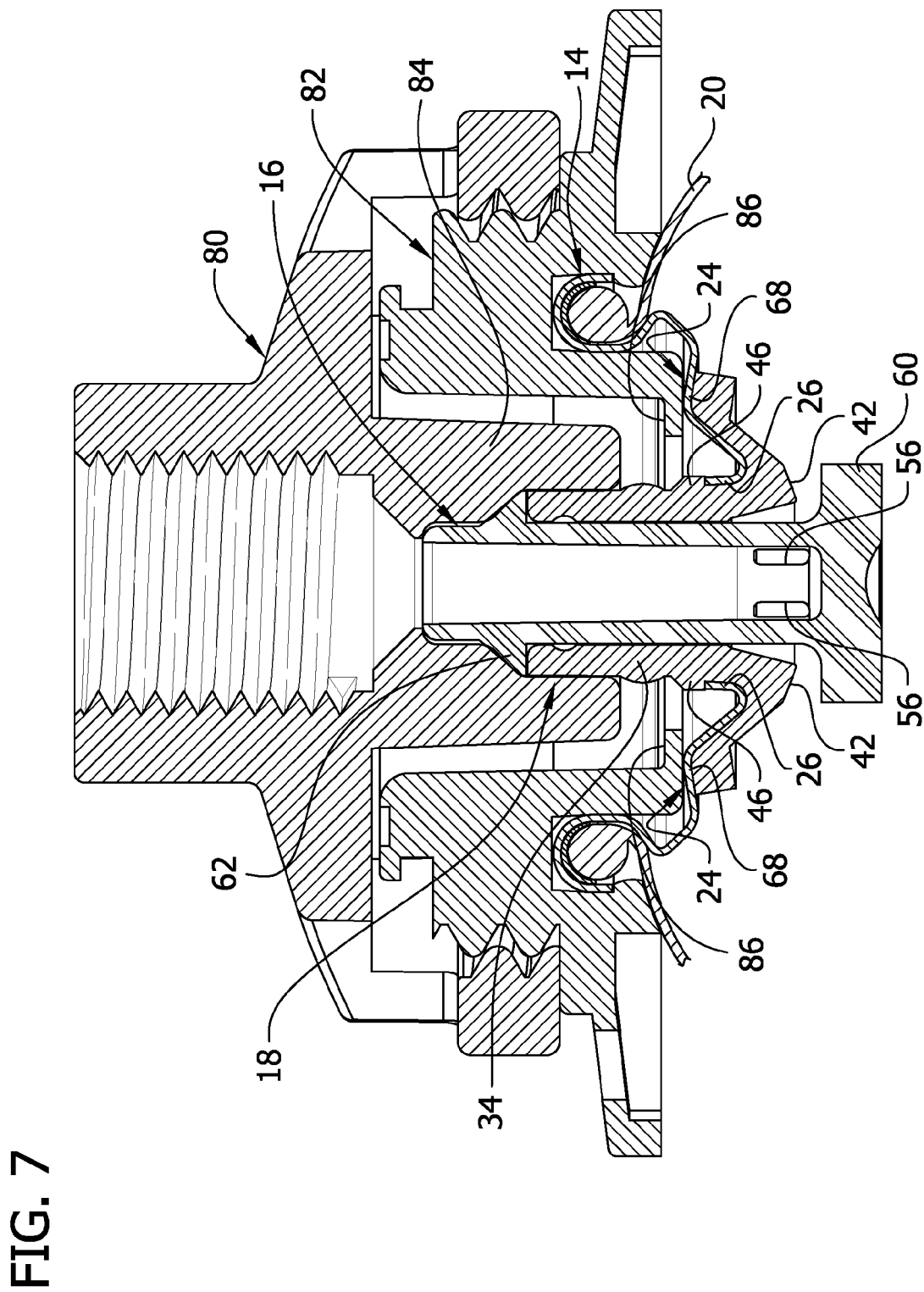
FIG. 7 is a cross section of a gun dispensing assembly including the valve, the pressurized container to which the valve is attached, a gun collar attached to the pressurized container, and a gun basket of the dispensing gun attached to the gun collar.

Referring to FIGS. 1-3, one embodiment of a valve for dispensing a flowable product (e.g., a chemical product or food product) from a container is generally indicated at reference numeral 10. The valve 10 comprises a mounting cup, generally indicated at 14; a stem, generally indicated at 16; and a seal (e.g., a grommet), generally indicated at 18, attached to the stem and disposed between and interconnecting the stem and the mounting cup. As shown in FIGS. 6 and 7, the illustrated valve 10 is suitable for attachment to a pressurized container 20 (e.g., an aerosol container), or other container, for dispensing flowable product contained within the container. In FIGS. 1 and 3, the valve 10 is shown in its pre-attached configuration, meaning that the valve is assembled but is not attached to a pressurized container. In FIG. 6 the valve 10 is shown in its attached, closed configuration, meaning that the valve is attached to the pressurized container 20 but the valve is closed (e.g., non-actuated). In FIG. 7 the valve 10 is shown in its attached, open configuration, meaning that the valve is attached to the pressurized container 20 and the valve has been opened (e.g., actuated), such as by a dispensing gun as shown. The orientation of the valve 10 in the drawings provides the point of reference for the terms defining relative locations and positions of structures and components of the valve, including but not limited to the terms "upper," "lower," "top," and "bottom," "upward," and "downward," as used throughout the present disclosure.

Referring to FIGS. 3 and 4A, the mounting cup 14, which may be formed from a piece of metal (e.g., tin plate steel, stainless steel or aluminum), has a generally cylindrical sidewall 22 defining an axis A of the mounting cup 14. In the illustrated embodiment, substantially an entirety of the sidewall 22 is generally parallel to the axis A of the mounting cup 14 when the valve is in its pre-attached configuration, as shown in FIG. 3, though in other embodiments the sidewall may be tapered. When the valve 10 is attached to the container 20 (FIG. 6), a portion of the sidewall 22 bulges radially outward relative to the axis A to secure the valve to the container. The mounting cup 14 further includes a bottom wall, generally indicated at 24, extending radially inward from adjacent a lower end of the sidewall 22. A central portion 26 of the bottom wall 24 defines a cylindrical opening 28, also known as a pierce hole, through which the seal 18 and the stem 16 extend. In the illustrated embodiment, the central portion 26 of the bottom wall 24 extends upward to define a collar or ferrule surrounding the seal 18. The opening 28 has an axial length extending between open upper and lower ends of the collar or ferrule. In other embodiments, the central portion 26 may not extend upward to define a collar or ferrule. Instead, the central portion 26 may be substantially planar and the opening 28 may extend therethrough and have an axial length corresponding to the thickness of the central portion. The configurations of the bottom wall 24 and the central portion 26 are explained in more detail below. The mounting cup 14 is configured for reception into an opening of the container 20, such as an opening in a top of the container 20 (as shown in FIG. 6) or a bottom of the container, and an upper curled lip 29 at an upper end of the sidewall 22 mates with the bead (curl) 30 of the container. The valve 10 is then secured to the container by crimping (clinching), for example.

Figure 5:
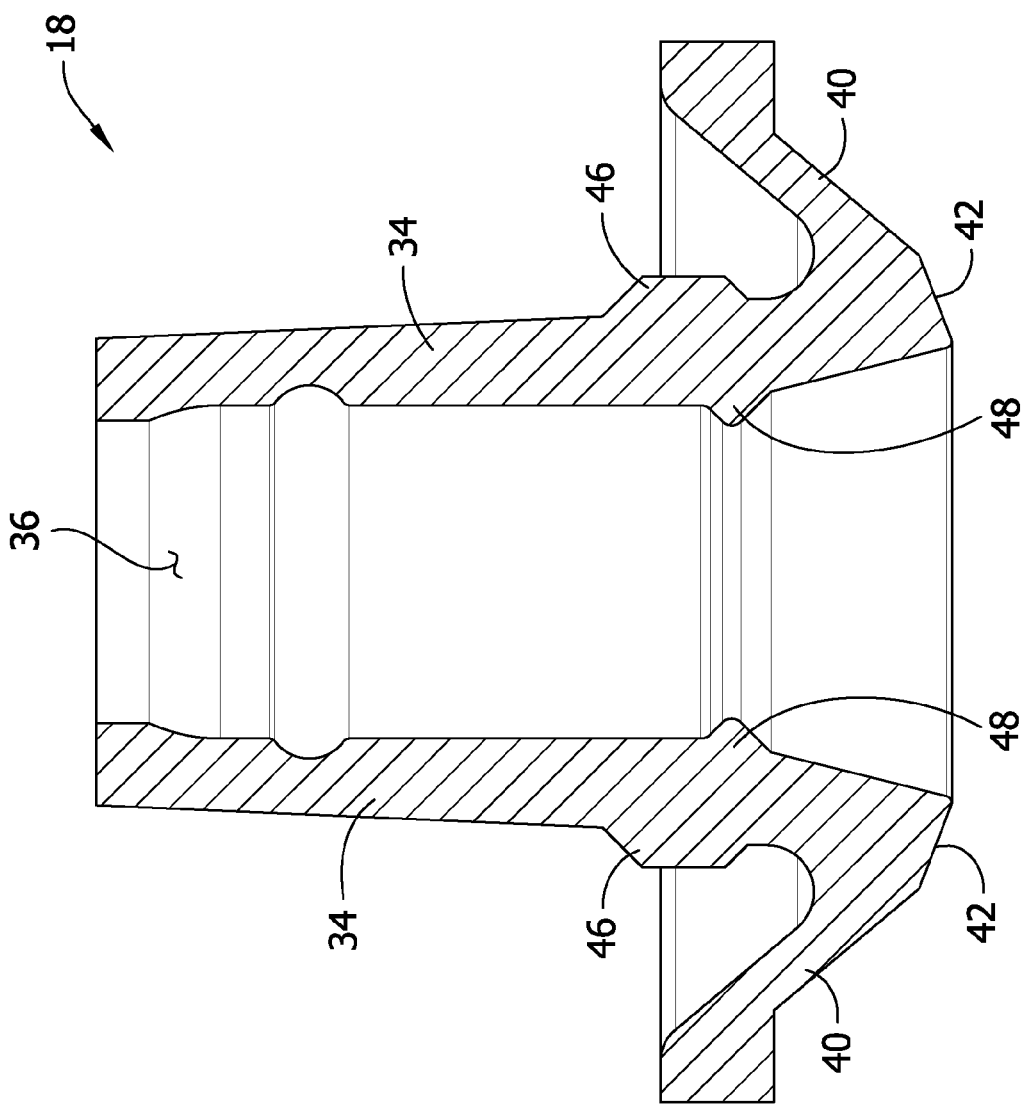
FIG. 5 is a cross section of the seal.

Referring to FIGS. 3 and 5, the seal 18 comprises an elongate neck portion 34 defining a longitudinal lumen 36 through which the stem 16 is received, as explained below. The lumen 36 is generally coaxial with the axis A of the mounting cup 14. A lower portion of the seal 18 underlies the bottom wall 24 of the mounting cup 14 and includes an annular flange portion 40 and seat portion 42 at a lower end of the seal defining a seat for the valve stem 16. As explained in more detail below, the annular flange portion 40 is normally pressed against the bottom wall 24 of the mounting cup 14 to form a leak proof seal therebetween when the valve 10 is secured to the container 20 (FIG. 6). An external seal bead 46 extends radially outward from the neck portion 34 of the seal 18. In at least one embodiment, at least one internal seal bead 48 may extend inward from an inner surface of the neck portion 34. The external, annular seal bead 46 engages an upper peripheral edge of the central portion 26 of the mounting cup 14 to secure the seal 18 to the mounting cup. The internal seal bead 48, when included, presses against the stem 16 to form a seal therebetween, otherwise the seal may be obtained by an interference fit between the inner wall of lumen 36 and the stem 16. The seal 18 may comprise a thermoset rubber (e.g., vulcanized rubber, such as vulcanized neoprene rubber) or thermoplastic elastomer (e.g., thermoplastic polyurethane), and may be formed by injection molding, compression molding, or transfer molding, for example.

The stem 16 comprises an elongate tubular stem body 52 with an outlet 54 and inlet(s) 56 at the upper and lower ends thereof, respectively, and a disc 60 (or button) at the lower end of the stem body. The stem body 52 fits snugly within the longitudinal lumen 36 defined by the seal 18 and engages the internal seal bead 48, when included in the design, to form a leak proof seal therebetween. An upper portion of the stem body 52 is exposed and extends through an open upper end of the seal 18. In the illustrated embodiment, the upper portion of the stem body 52 includes an annular shoulder 62 extending laterally outward from the stem body and overlying and engaging the upper end of the seal 18. At the lower end of the stem 16, the disc 60 seats against the seat portion 42 of the seal 18 to form a leak proof seal therebetween when the valve 10 is closed (e.g., in a non-actuated configuration). In other embodiments, the upper portion of the stem body 52, above annular shoulder 62, may include a thread (or other connector or connecting structure) for connecting the stem 16 to an actuator or other device. As an example, the upper portion of the stem body 52 may include a thread onto which an actuation device may be attached when the valve 10 is used as a tilt valve, as generally known in the art. In yet other embodiments, the valve may be used without any additional actuator and may include a component for profiling or shaping the dispensed product.

As shown in FIG. 7, the disc 60 of the stem 16 is movable away from the seat portion 42 of the seal 18 to open the valve (e.g., move the valve to an actuated configuration) to allow flowable product in the container 20, via pressure in the container, to flow between the disc and the seat portion and into the inlet(s) 56 of the stem 16. As disclosed above, the valve 10 may function as a "vertically actuated" valve, or alternatively, as a "tilt" valve, depending on the actuator used to operate the valve. For example, when used as a vertically actuated valve, an axial force is applied to the stem 16 (e.g., the shoulder 62 of the stem) to unseat the disc 60 from the seat portion 42 of the seal 18, as shown in FIG. 7 and described in more detail below. In another example, when used as a tilt valve (not shown), a force is applied to the side of stem 16 to rotate or pivot the stem and unseat the disc 60 from the seat portion 42, as is generally known in the art.

Referring to FIG. 4A, an annular side-to-bottom transition portion, generally indicated at 66, of the mounting cup 14 is disposed between the lower end of the sidewall 22 and the bottom wall 24 thereof. The side-to-bottom transition portion 66 curves inward (e.g., is radiused) from the lower end of the sidewall 22 to the bottom wall 24. The side-to-bottom transition portion 66 has an upper boundary (or extent) defined by an upper, annular radius line defining upper radius line plane RL1 transverse to the axis A, and a lower boundary (or extent) defined by a lower, annular radius line RL2 defining lower radius plane RL2 transverse to the axis A. The bottom wall 24 has an annular outer radial portion 68 extending radially inward from the side-to-bottom transition portion 66, and an annular inner radial portion 70 extending radially inward from adjacent an inner radial edge of the outer radial portion toward the axis A of the mounting cup and the central portion 26. In the illustrated embodiment, the outer radial portion 68 is generally flat and extends generally orthogonal to the axis A of the mounting cup 14 when the valve 10 is in its pre-attached configuration (FIGS. 3 and 4A). When the valve 10 is attached to the container, such as shown in FIG. 6, the outer radial portion 68 of bottom wall 24 may not remain in a flat position orthogonal to the axis A of the mounting cup 14 but may extend upward or downward from the sidewall 22 at an angle greater than or less than 90 degrees relative to the axis A of the mounting cup. The outer radial portion may be of other configurations and orientations both in its pre-attached and attached configurations.

In the illustrated embodiment, the inner radial portion 70 extends downward at an angle α relative to a plane extending orthogonal to the axis A of the mounting cup 14. For example, this angle α may measure from greater than 0 degrees (e.g., about 5 degrees) to about 90 degrees, or may be an acute angle measuring from about 25 degrees to about 50 degrees, and in one example, about 45 degrees. In another embodiment, the inner radial portion 70 may extend at an angle measuring 0 degrees. An annular first bottom transition portion 76 is disposed between and interconnects the inner and outer radial portions 68, 70, respectively. The first bottom transition portion 76 curves downward (e.g., has a concave radius when viewed from the bottom) from the outer radial portion 68 to the inner radial portion 70. An annular second bottom transition portion 78, as shown in the illustrated embodiment, is disposed between and interconnects an inner radial edge of the inner radial portion 70 and the central portion 26. The second bottom transition portion 78 curves upward (e.g., has a convex radius when viewed from the bottom).

Referring still to FIG. 4A, in one embodiment, the upper end of the central portion 26 defining the opening 28 (e.g., the end of the central portion that is engaged by the external seal bead 46 in the illustrated embodiment lies in a plane P1) is at (e.g., coplanar with) or below (e.g., entirely below) the upper radius line plane RL1. In one or more embodiments, the upper end of the central portion 26 defining the opening 28 (e.g., the end of the central portion that is engaged by the external seal bead 46 in the illustrated embodiment lies in a plane P1) is at (e.g., coplanar with) or below (e.g., entirely below) the lower radius line plane RL2. In one or more embodiments, the upper end of the central portion 26 defining the opening 28 (e.g., the end of the central portion that is engaged by the external seal bead 46 in the illustrated embodiment lies in a plane P1) is at (e.g., coplanar with) or below (e.g., entirely below) an imaginary line L1 perpendicular to the central axis A and tangent to a lower portion of an imaginary circle C1 defined by the radius of the annular sidewall-bottom transition portion 66. In the illustrated embodiment shown in FIG. 4A, the imaginary line L1 and the lower radius line plane RL2 are coplanar, although in other embodiments, the imaginary line L1 and the lower radius line RL2 may not be coplanar (i.e., may be spaced apart along the axis A). In the illustrated embodiment shown in FIG. 4A, the plane P1 is below (e.g., entirely below) the line L1 and lower radius line plane RL2. In one or more embodiments, a distance d0 between the upper radius line plane RL1 and the plane P1 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d1 between the imaginary line L1 and the plane P1 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d2 between the lower radius line plane RL2 and the plane P1 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Figure 4B:
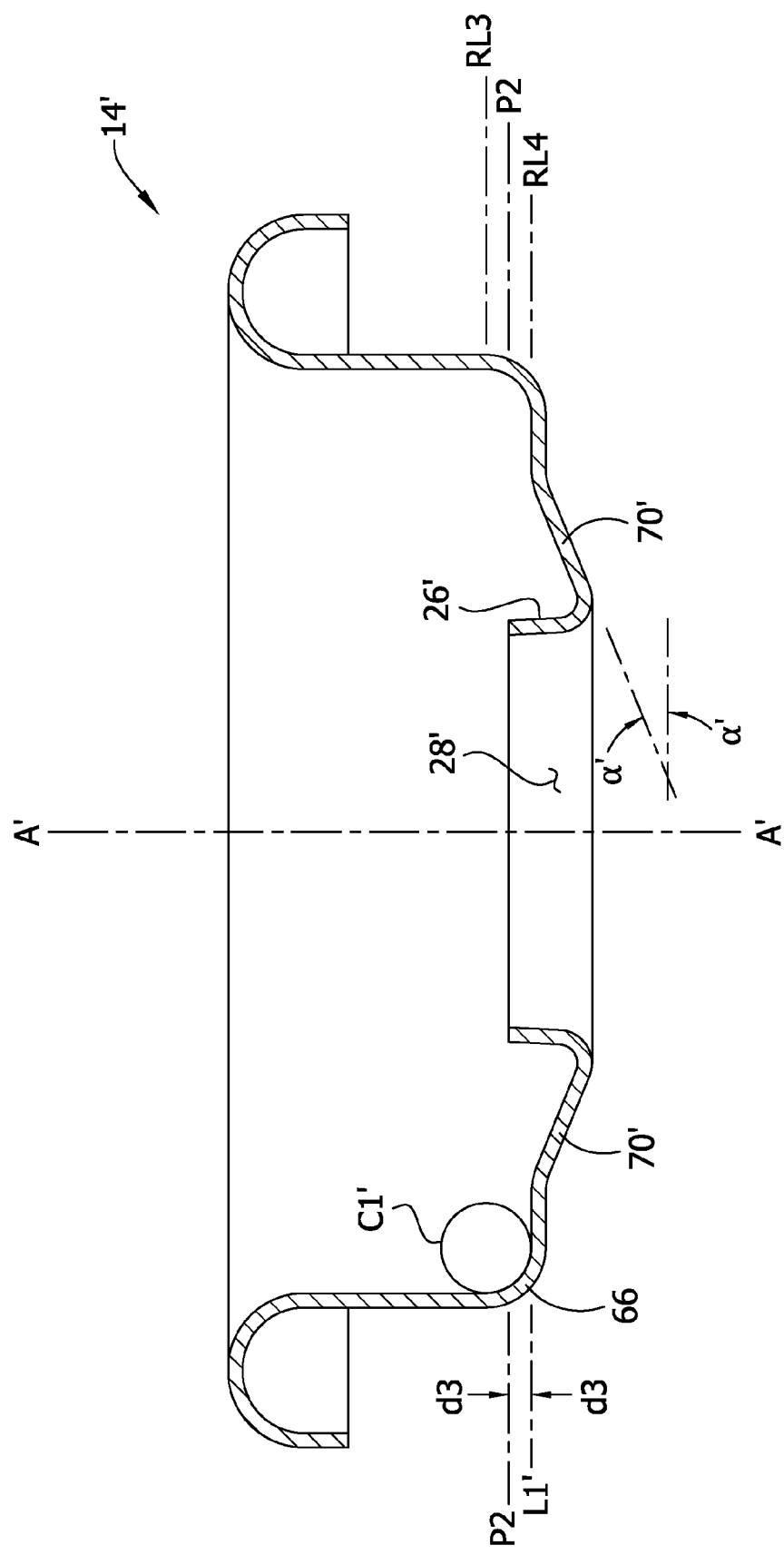
FIG. 4B is a cross section of another embodiment of a mounting cup similar to the mounting cup of FIG. 4A.

As shown in the illustrated embodiment of FIG. 4B and indicated generally at reference numeral 14', the upper end of the central portion 26' defining the opening 28' (e.g., the end of the central portion that is engaged by the external seal bead 46 in the illustrated embodiment lies in a plane P2) is slightly above the lower radius line plane RL4 and/or the line L1' perpendicular to the central axis A' and tangent to the lower portion of the imaginary circle C1' defined by the radius of the annular sidewall-bottom transition portion 66. In one embodiment, a distance d3 between the imaginary line L1' (and the lower radius line plane RL4) and the plane P2 in which the upper end of the central portion 26' lies may be from about 0.000 in (0.000 mm) to about 0.040 in (1.016 mm) (e.g., no greater than 0.040 in). In this illustrated embodiment, the plane P2 is below (e.g., entirely below) the upper radius line plane RL3. Accordingly, the plane P2 is intermediate the upper radius line plane RL3 and the imaginary line L1' (and the lower radius line plane RL4) along the axis A. In this embodiment, the inner radial portion 70' extends downward at an angle α' relative to a plane extending orthogonal to the axis A' of the mounting cup 14' that is less than the angle α of the first mounting cup 14.

In FIG. 7 a gun basket, generally indicated at 80, of a dispensing gun is attached (e.g., threaded onto) a gun collar (broadly, a connector), generally indicated at 82, which is attached to the valve 10 after the valve is attached to the container 20. As the gun basket 80 is threaded onto the gun collar 82, the upper portion of the stem 16 and the neck portion 34 of the seal 18 enter a hub 84 of the gun basket. An internal shoulder of the hub engages the shoulder 62 of the stem 16 to drive axial movement of the stem relative to the seal 18 and unseat the stem disc 60 from the seat portion 42 of the seal. As the stem 16 moves downward, the neck portion 34 of the seal 18 compresses between the shoulder 62 of the stem and the upper peripheral edge of the central portion 26, and the neck portion 34 of the seal bulges outward inside the hub 84 to create a leak proof seal therein. Because the upper end of the central portion 26 is at or below at least a junction of the sidewall 22 and the annular sidewall-bottom transition portion 66, such as at or below (e.g., below) an entirety of the outer radial portion 68 of the bottom wall 24 as can be seen from FIG. 7, if the gun basket hub 84 is of a design that allows it to approach the bottom wall 24 when the gun collar 82 is threaded fully into the gun basket 80, the gun collar 82 will "bottom out" in the gun basket 80 before the gun basket hub 82 engages the external seal bead 46. This inhibits the external sealing bead 46 from being pinched between the hub 84 and the upper peripheral edge of the central portion 26, thereby inhibiting the external seal bead from shearing off.

Figure 8:
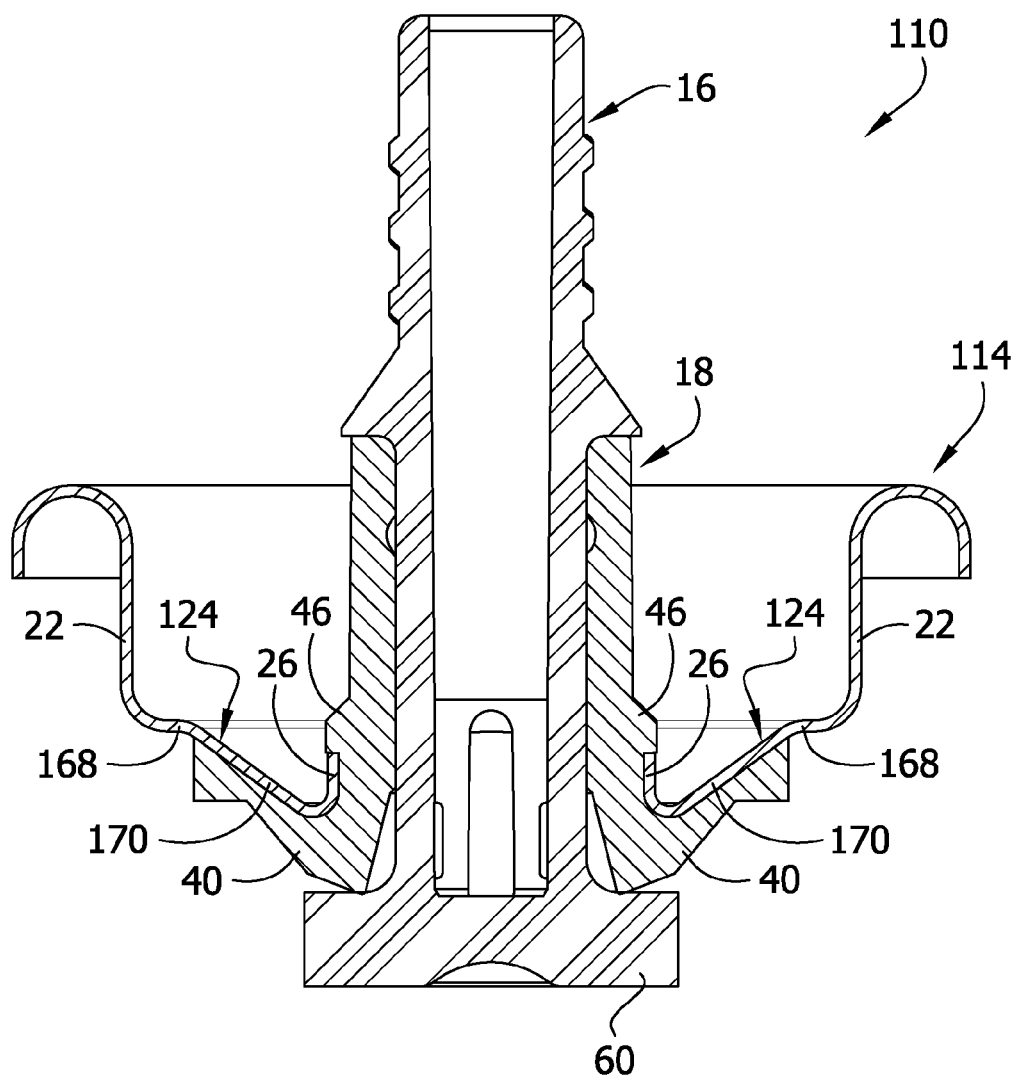
FIG. 8 is a cross section of a second embodiment of a valve.
Figure 9:
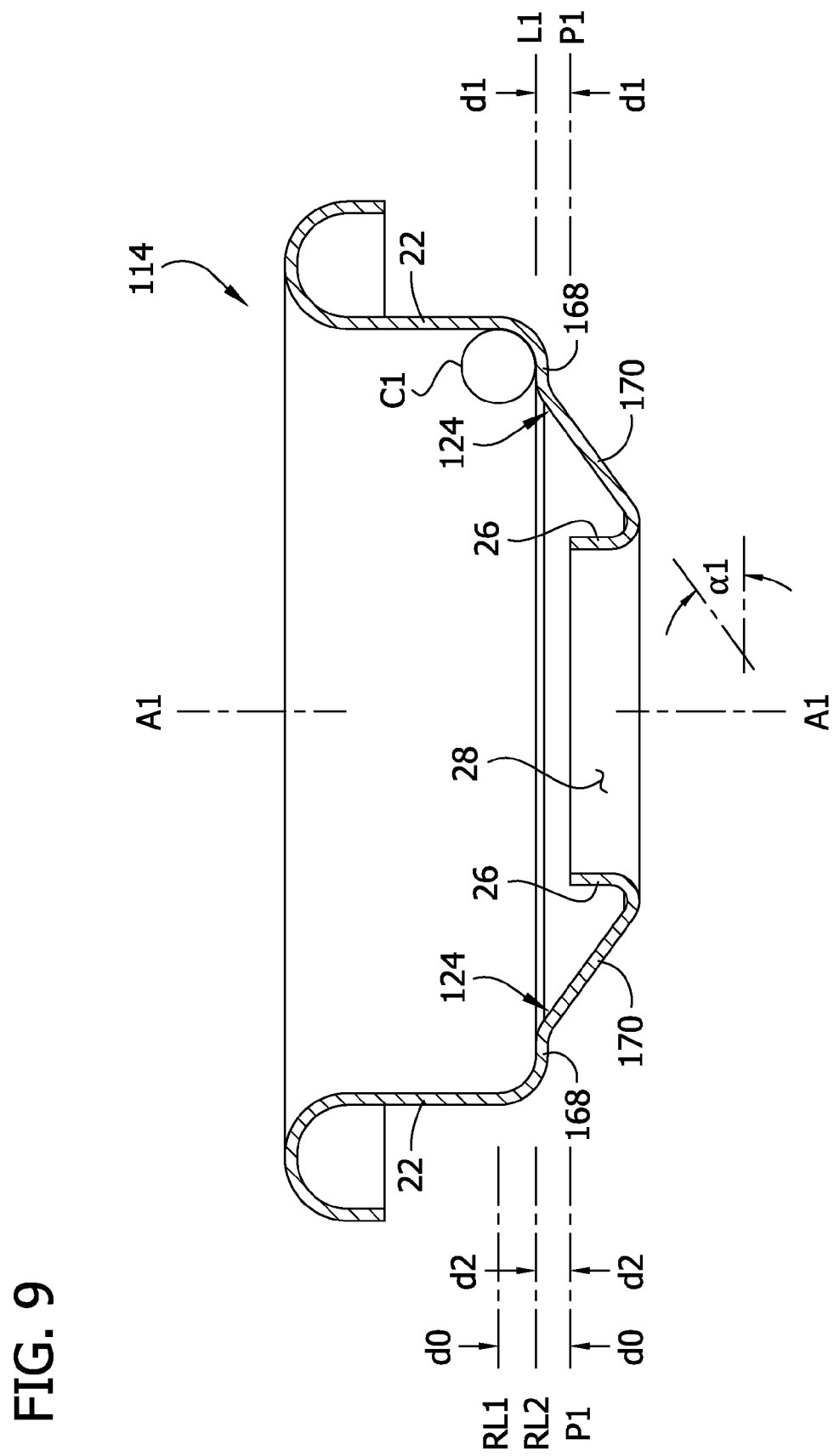
FIG. 9 is an enlarged cross section of a mounting cup of the second valve embodiment.

Referring to FIGS. 8 and 9, another embodiment of a valve constructed according to the teachings of the present disclosure is generally indicated at reference numeral 110. This valve 110 is similar to the first valve 10, with differences between the valves being disclosed below. Identical components and structures are indicated by corresponding reference numerals, and similar, but not identical, components and structures are indicated by corresponding reference numerals plus 100. Unless otherwise indicated, the teachings and disclosure set forth above with respect to the first valve 10 apply equally to the present valve 110. The main differences between the present valve 110 and the first valve 10 is the respective radial dimensions of the outer and inner radial portions 168, 170 of the bottom wall 124 of the present mounting cup 114 and the relationship between the flanges 40 of the seal 18 and the mounting cup. In particular, the radial dimension of the outer radial portion 168 is shortened and the radial dimension of the inner radial portion 170 is extended. As such, the flanges 40 of the seal 18 extend along the inner radial portion 170 but do not extend to the outer radial portion 168. Moreover, because the radial dimension of the inner radial portion 170 is extended, the downward slope of the inner radial portion may be less than the slope of the inner radial portion 70 of the first valve. In other words, the inner radial portion 170 may extend downward at an angle α1 relative to a plane extending orthogonal to the axis A1 of the mounting cup 114 that is less than the angle α of the first valve 10.

Figure 10:
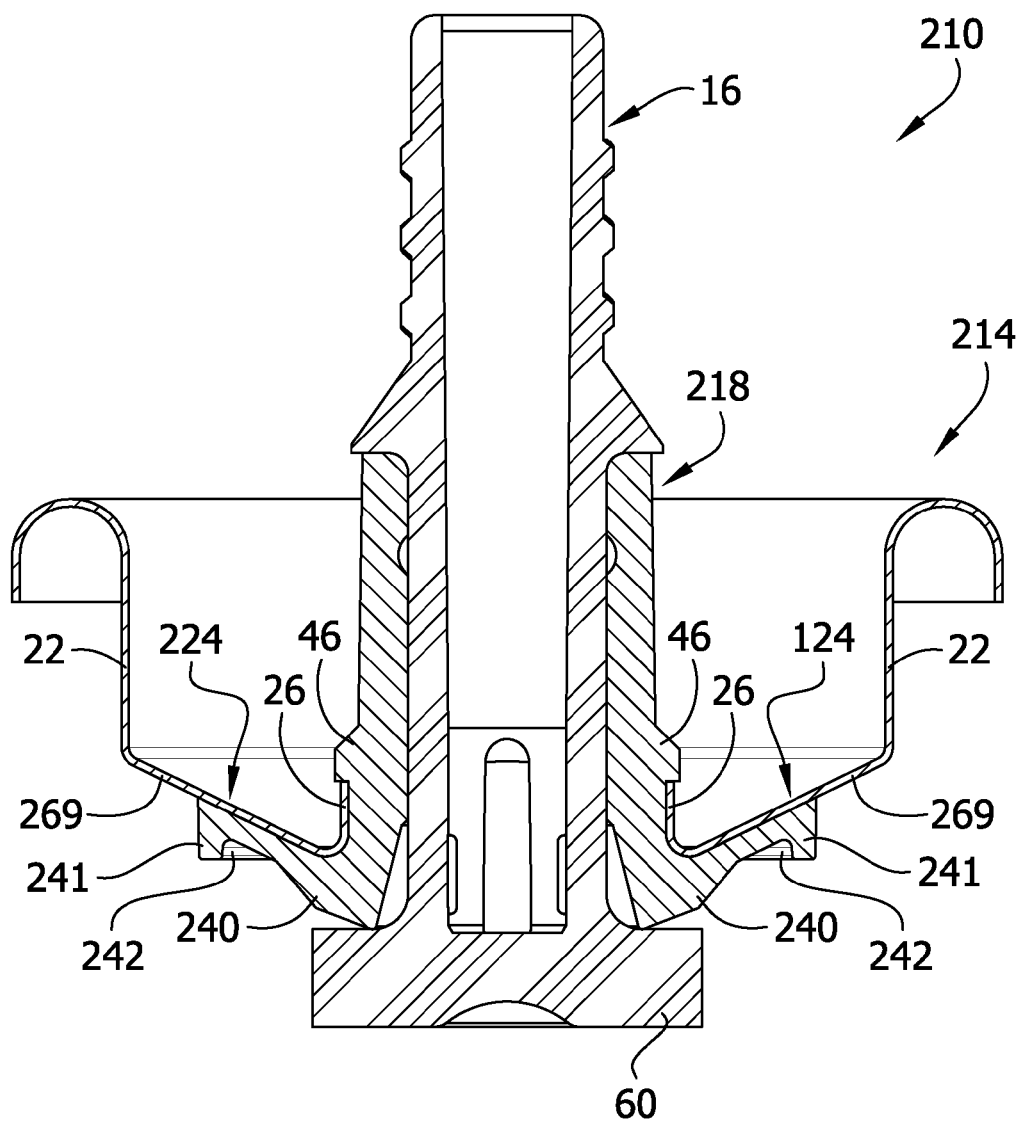
FIG. 10 is a cross section of a third embodiment of a valve.
Figure 11:
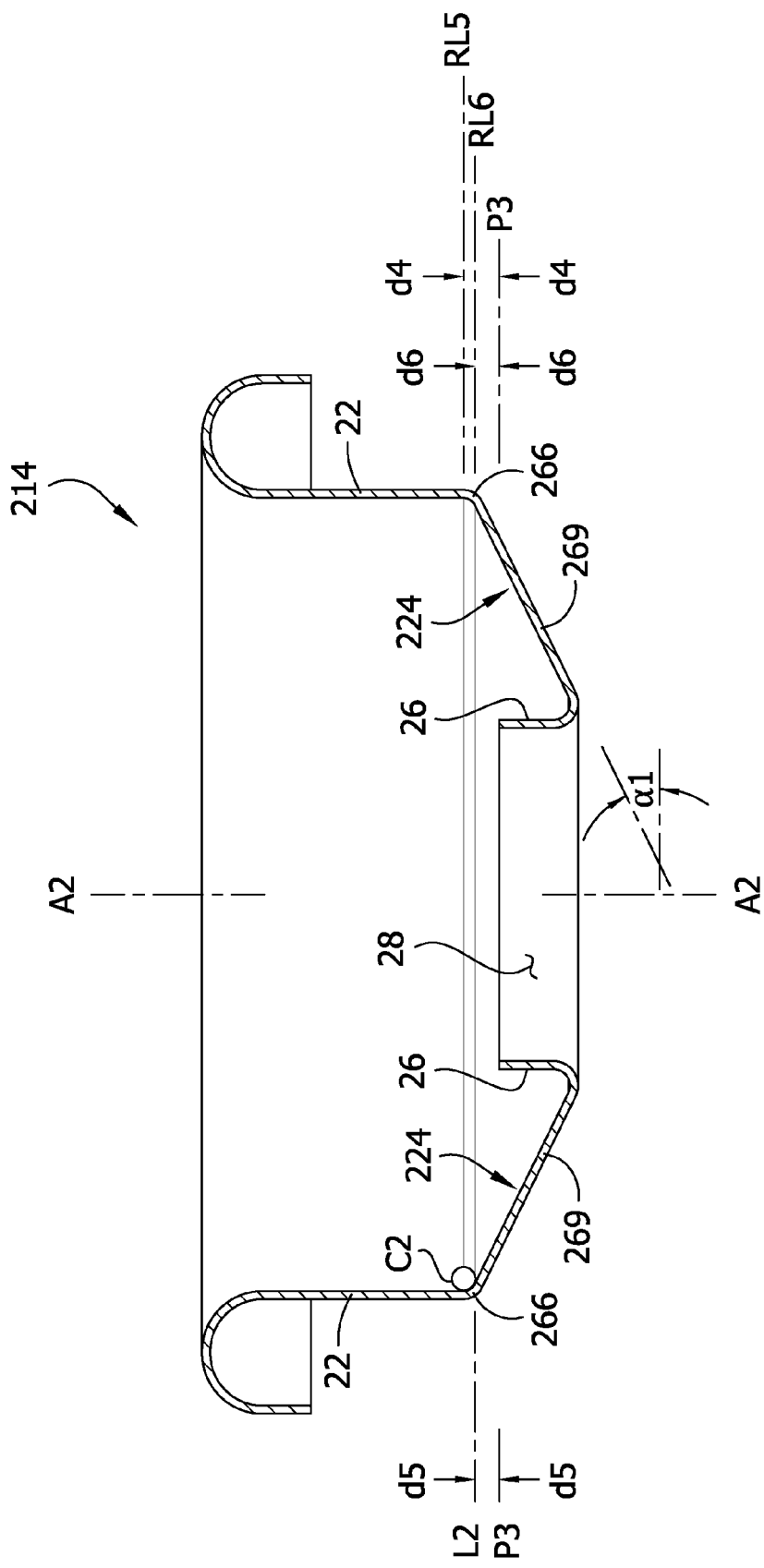
FIG. 11 is an enlarged cross section of a mounting cup of the third valve embodiment.

Referring to FIGS. 10 and 11, another embodiment of a valve constructed according to the teachings of the present disclosure is generally indicated at reference numeral 210. The valve 210 is similar to the first valve 10. Identical components and structures are indicated by corresponding reference numerals, and similar, but not identical components and structures, are indicated by corresponding reference numerals plus 200. Unless otherwise indicated, the teachings and disclosure set forth above with respect to the first valve 10 apply equally to the present valve 210. The seal 218 is similar to seal 18, except that the seal 218 includes a depending terminal flange 241 at the outer end of the flange 240. The terminal flange 241 is generally annular shaped and extends around the flange 240. The terminal flange 241 extends generally downward from the flange 240 to define an annular groove 242 of the seal. In use, pressure within the can is exerted against the flange 240 within the annular groove 242 to facilitate sealing of the flange against the radial portion 269 of the bottom wall 224.

Referring to FIG. 11, an annular side-to-bottom transition portion, generally indicated at 266, of the mounting cup 214 is disposed between the lower end of the sidewall 22 and the bottom wall 224 thereof. The side-to-bottom transition portion 266 curves inward (e.g., is radiused) from the lower end of the sidewall 22 to the bottom wall 224. The side-to-bottom transition portion 266 has an upper boundary (or extent) defined by an upper, annular radius line defining upper radius line plane RL5 transverse to the axis A2, and a lower boundary (or extent) defined by a lower, annular radius line RL6 defining lower radius line plane RL6 transverse to the axis A2. The bottom wall 224 has an annular radial portion 269 extending radially inward from the side-to-bottom transition portion 266 to the central portion 26 of the bottom wall. In the illustrated embodiment, the radial portion 269 extends downward at a constant angle α2 (e.g., a constant slope) relative to a plane extending orthogonal to the axis A2 of the mounting cup 214 when the valve 210 is in its pre-attached configuration. For example, this angle α2 may measure from about 5 degrees to about 90 degrees, or may be an acute angle measuring from about 25 degrees to about 50 degrees, and in one example, about 30 degrees. When the valve 210 is attached to the container, the radial portion 269 of bottom wall 224 may or may not remain at this pre-attached angle α2. For example, the radial portion 269 may extend upward or downward from the sidewall 22 at an angle greater than or less than its pre-attached angle α2. The radial portion 269 may be of other configurations and orientations both in its pre-attached and attached configurations.

Referring still to FIG. 11, in one embodiment, the upper end of the central portion 26 defining the opening 28 (e.g., the end of the central portion that is engaged by the external seal bead 46 in the illustrated embodiment lies in a plane P3) is at (e.g., coplanar with) or below (e.g., entirely below) the upper radius line plane RL5. In one or more embodiments, the upper end of the central portion 26 defining the opening 28 (e.g., the end of the central portion that is engaged by the external seal bead 46 in the illustrated embodiment lies in a plane P3) is at (e.g., coplanar with) or below (e.g., entirely below) the lower radius line plane RL6. In one or more embodiments, the upper end of the central portion 26 defining the opening 28 (e.g., the end of the central portion that is engaged by the external seal bead 46 in the illustrated embodiment lies in a plane P3) is at (e.g., coplanar with) or below (e.g., entirely below) an imaginary line L2 perpendicular to the central axis A2 and tangent to a lower portion of an imaginary circle C2 defined by the radius of the annular sidewall-bottom transition portion 266. In the illustrated embodiment shown in FIG. 11, the imaginary line L2 and the lower radius line plane RL6 are coplanar, although in other embodiments, the imaginary line L2 and the lower radius line RL6 may not be coplanar (i.e., spaced apart along the axis A2). In the illustrated embodiment shown in FIG. 11, the plane P3 is below (e.g., entirely below) the line L2 and lower radius line plane RL6.

In one or more embodiments, a distance d4 between the upper radius line plane RL5 and the plane P2 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d5 between the imaginary line L2 and the plane P3 may be from about 0.0 mm to about 25.0 mm, or from about 0.25 mm to about 10.0 mm, or from about 0.1 mm to about 2.5 mm, or from about 0.25 mm to about 2.0 mm, or about 1.0 mm, or about 0.50 mm. In one or more embodiments, a distance d6 between the lower radius line plane RL6 and the plane P2 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Figure 12:
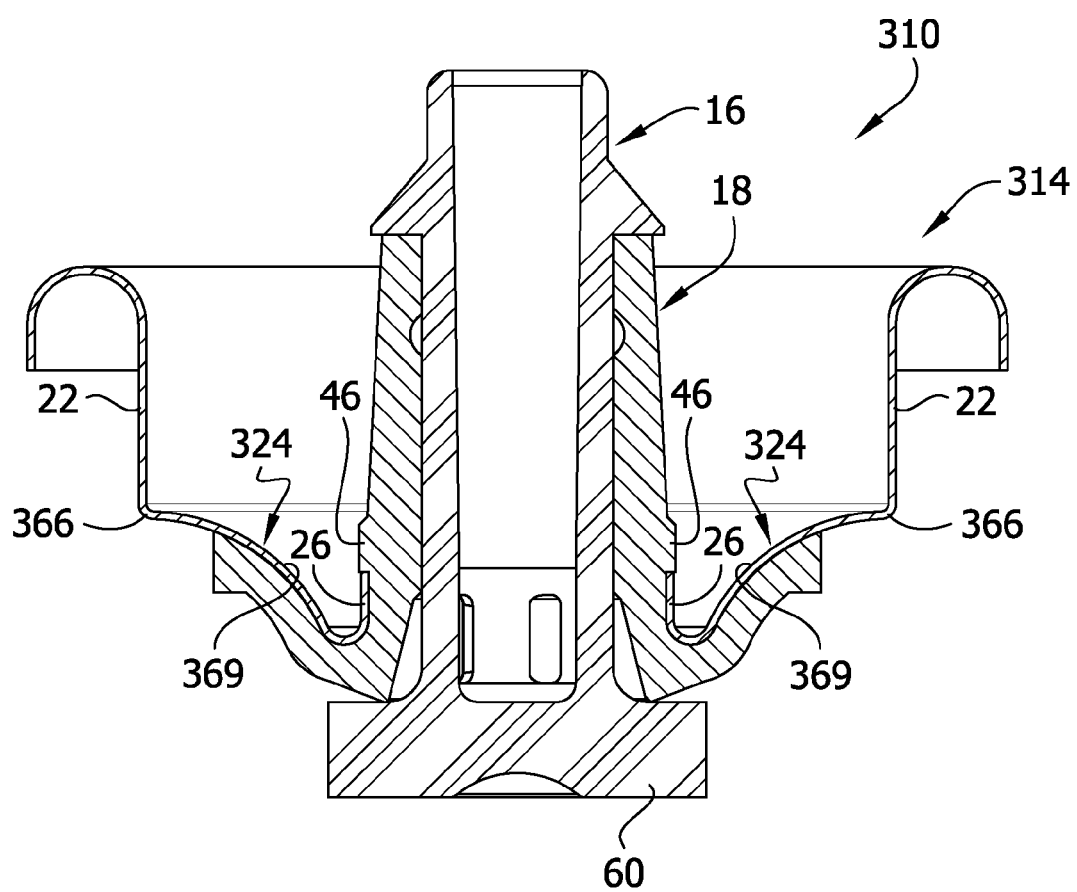
FIG. 12 is a cross section of a fourth embodiment of a valve.
Figure 13:
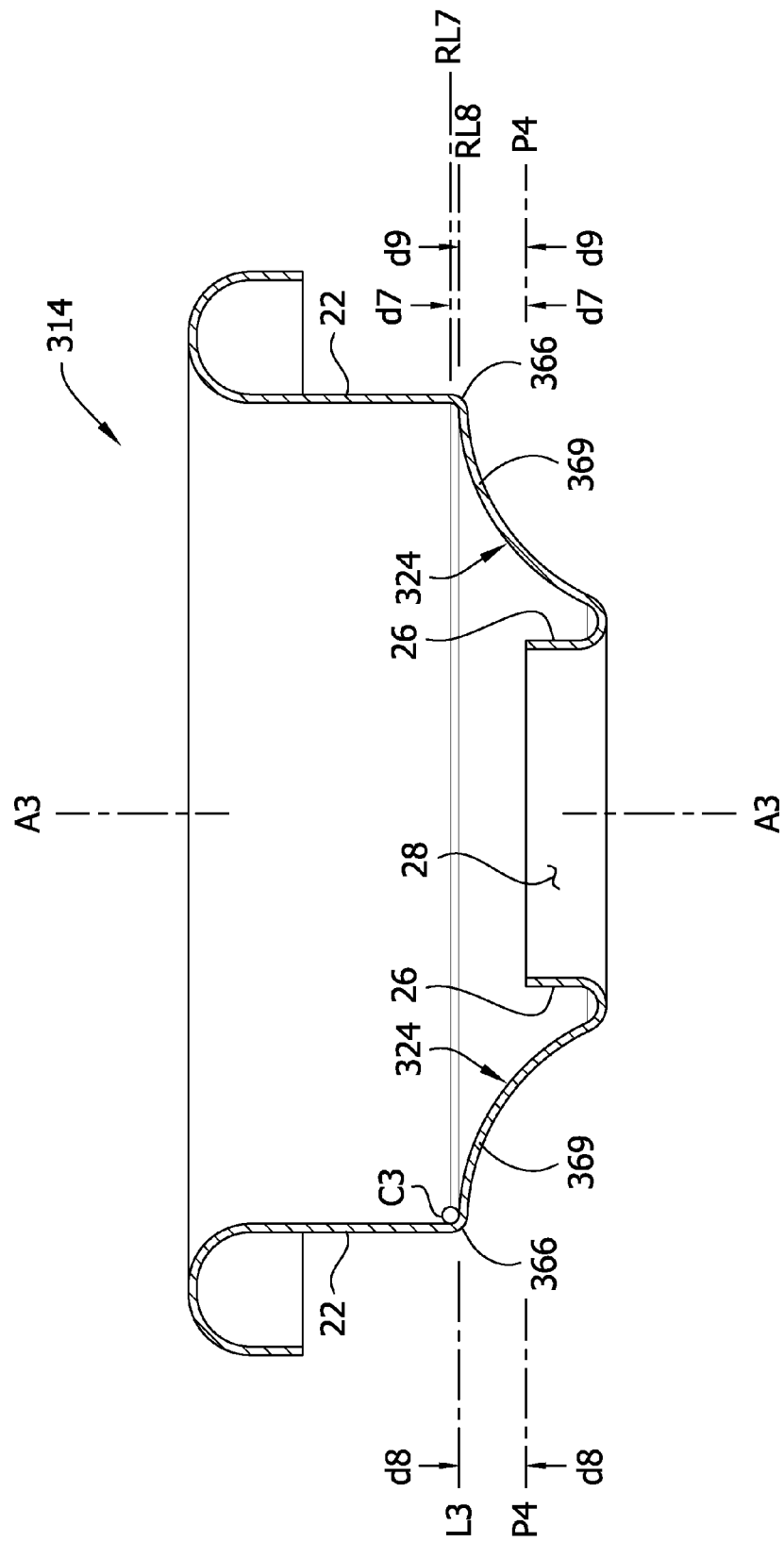
FIG. 13 is an enlarged cross section of a mounting cup of the fourth valve embodiment.

Referring to FIGS. 12 and 13, another embodiment of a valve constructed according to the teachings of the present disclosure is generally indicated at reference numeral 310. This valve 310 is similar to the third valve 210, with differences between the valves being disclosed below. Identical components and structures are indicated by corresponding reference numerals, and similar, but not identical, components and structures are indicated by corresponding reference numerals plus 100. Unless otherwise indicated, the teachings and disclosure set forth above with respect to the third valve 210 apply equally to the present valve 310. The main differences between the present valve 310 and the third valve 210 is the radial portion 369 of the bottom wall 324 is arcuate shaped and curves upward along its length (i.e., is concave when viewed from bottom), unlike the radial portion 269 of the bottom wall 224 of the third valve 210 which has a substantially constant slope or angle extending downward. Another difference is that an imaginary circle C3 defined by the radius of the annular sidewall-bottom transition portion 366 is smaller than the imaginary circle C2.

Referring still to FIG. 13, in one embodiment, the upper end of the central portion 26 defining the opening 28 (e.g., the end of the central portion that is engaged by the external seal bead 46 in the illustrated embodiment lies in a plane P4) is at (e.g., coplanar with) or below (e.g., entirely below) the upper radius line plane RL7. In one or more embodiments, the upper end of the central portion 26 defining the opening 28 (e.g., the end of the central portion that is engaged by the external seal bead 46 in the illustrated embodiment lies in a plane P4) is at (e.g., coplanar with) or below (e.g., entirely below) the lower radius line plane RL8. In one or more embodiments, the upper end of the central portion 26 defining the opening 28 (e.g., the end of the central portion that is engaged by the external seal bead 46 in the illustrated embodiment lies in a plane P4) is at (e.g., coplanar with) or below (e.g., entirely below) an imaginary line L3 perpendicular to the central axis A3 and tangent to a lower portion of an imaginary circle C3 defined by the radius of the annular sidewall-bottom transition portion 366. In the illustrated embodiment shown in FIG. 13, the imaginary line L3 and the lower radius line plane RL8 are coplanar, although in other embodiments, the imaginary line L3 and the lower radius line RL8 may not be coplanar (i.e., spaced apart along the axis A3). In the illustrated embodiment shown in FIG. 13, the plane P4 is below (e.g., entirely below) the line L3 and lower radius line plane RL8.

In one or more embodiments, a distance d7 between the upper radius line plane RL7 and the plane P4 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d8 between the imaginary line L3 and the plane P4 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d9 between the lower radius line plane RL8 and the plane P4 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Referring to FIGS. 14-17, another embodiment of a valve constructed according to the teachings of the present disclosure is generally indicated at reference numeral 410. This valve 410 is similar to the third valve 210, with differences between the valves being disclosed below. Identical components and structures are indicated by corresponding reference numerals, and similar, but not identical, components and structures are indicated by corresponding reference numerals plus 200. Unless otherwise indicated, the teachings and disclosure set forth above with respect to the third valve 210 apply equally to the present valve 410. The seal 418 is similar to seal 218, except that the terminal flange 441 at the outer end of the flange 440 flares outward. The terminal flange 441 is generally annular shaped and extends around the flange 440. The terminal flange 441 extends generally downward from the flange 240 and flares outward to define an annular groove 442 of the seal. In use, pressure within the can is exerted against the flange 440 within the annular groove 442 to facilitate sealing of the flange against the radial portion 469 of the bottom wall 424.

Another difference between the present valve 410 and the third valve 210 is the radial portion 469 of the bottom wall 424 is arcuate shaped, extends downward and curves downward along its length (i.e., is convex or dome-shaped when viewed from bottom), unlike the radial portion 269 of the bottom wall 224 of the third valve 210 which has a substantially constant slope or angle extending downward. In one example, the bottom wall may have a radius of about 0.450 in (1.143 cm).

Figure 17:
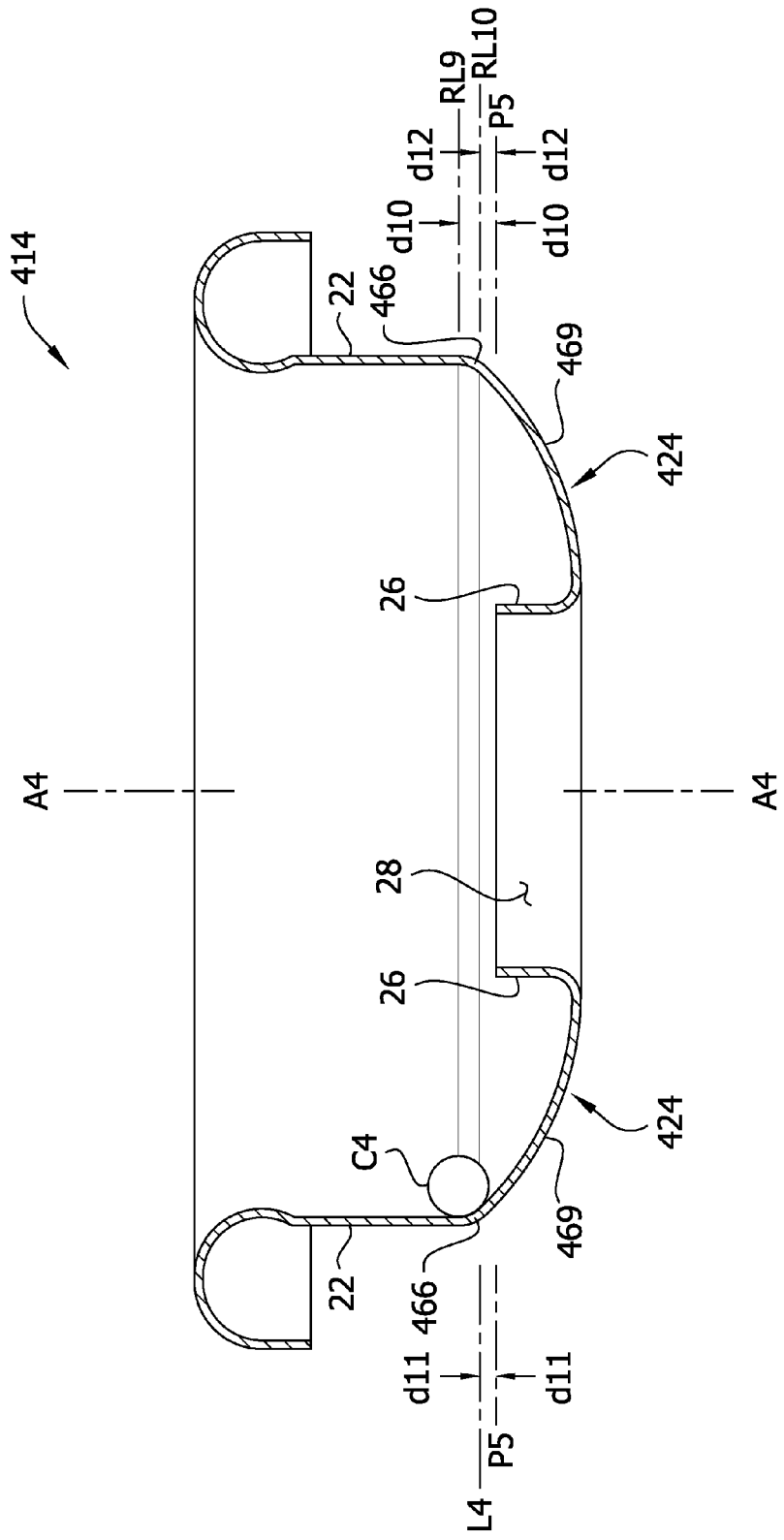
FIG. 17 is an enlarged cross section of a mounting cup of the fifth valve embodiment.

Referring still to FIG. 17, in one embodiment, the upper end of the central portion 26 defining the opening 28 (e.g., the end of the central portion that is engaged by the external seal bead 46 in the illustrated embodiment lies in a plane P5) is at (e.g., coplanar with) or below (e.g., entirely below) the upper radius line plane RL9. In one or more embodiments, the upper end of the central portion 26 defining the opening 28 (e.g., the end of the central portion that is engaged by the external seal bead 46 in the illustrated embodiment lies in a plane P5) is at (e.g., coplanar with) or below (e.g., entirely below) the lower radius line plane RL10. In one or more embodiments, the upper end of the central portion 26 defining the opening 28 (e.g., the end of the central portion that is engaged by the external seal bead 46 in the illustrated embodiment lies in a plane P5) is at (e.g., coplanar with) or below (e.g., entirely below) an imaginary line L4 perpendicular to the central axis A4 and tangent to a lower portion of an imaginary circle C4 defined by the radius of the annular sidewall-bottom transition portion 466. In the illustrated embodiment shown in FIG. 17, the imaginary line L4 and the lower radius line plane RL10 are coplanar, although in other embodiments, the imaginary line L4 and the lower radius line RL10 may not be coplanar (i.e., spaced apart along the axis A4). In the illustrated embodiment shown in FIG. 17, the plane P5 is below (e.g., entirely below) the line L4 and lower radius line plane RL10.

In one or more embodiments, a distance d10 between the upper radius line plane RL9 and the plane P5 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d11 between the imaginary line L4 and the plane P5 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d12 between the lower radius line plane RL10 and the plane P5 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Figure 18:
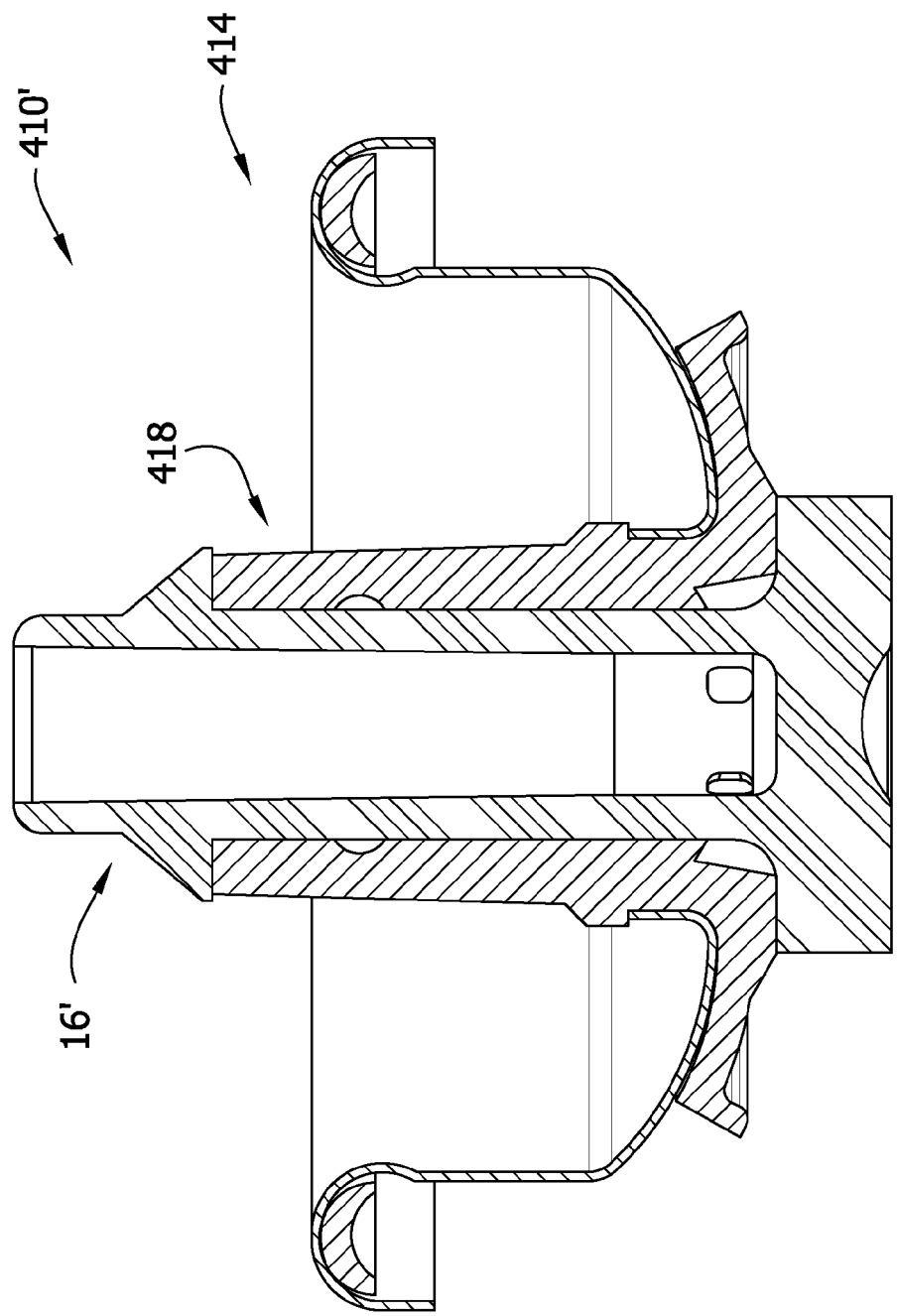
FIG. 18 is cross section of a sixth valve embodiment.

Referring to FIG. 18, another valve, generally indicated at reference 410', is identical to the valve 410, except that the stem 16, which is a tilt stem, is replaced with a "vertically actuated" stem (or gun valve stem) 16'. All other components of the valve 410' are identical to the corresponding components of the valve 410.

It is believed that each of the other valve embodiments of the present disclosure provide the same advantages as set forth above with respect to the first valve 10. Accordingly, the advantages set forth above with respect to the first valve 10 apply equally to the other valve embodiments.

Figure 19:
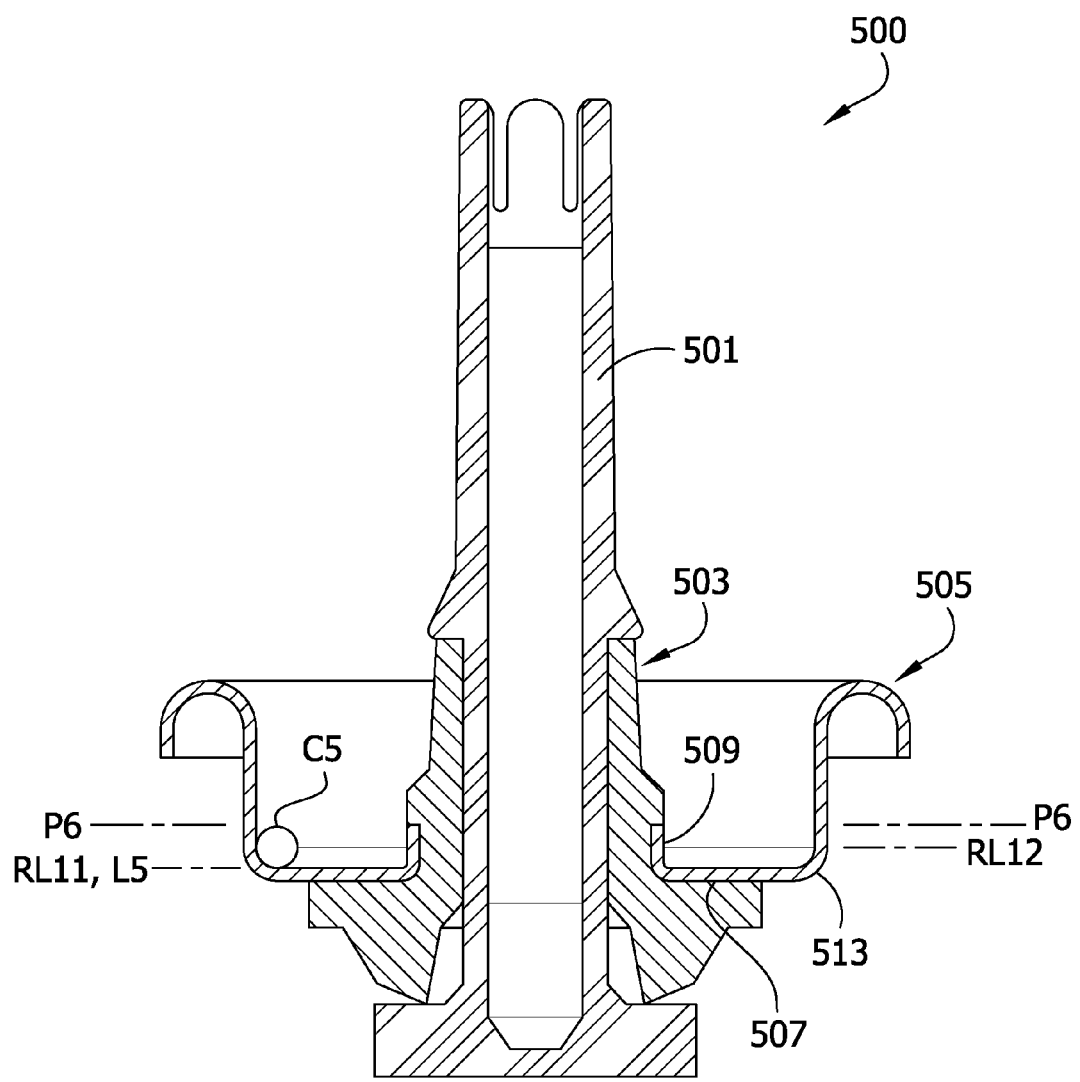
FIG. 19 is a cross section of a conventional valve.

In addition, each of the valve embodiments of the present disclosure provides the following advantages over a conventional valve. As shown in FIG. 19, a typical prior art valve is generally indicated at reference numeral 500. The illustrated prior art valve is a tilt valve including a tilt stem 501, a seal 503, and a mounting cup 505. As was typical with this type of prior art valve, the bottom wall 507 of the mounting cup defines a cylindrical opening 509, also known as a pierce hole, through which the seal 503 and the stem 501 extend, and the plane P6 in which the upper end of the pierce hole is disposed is above the lower radius line plane RL11 and an imaginary line L5 perpendicular to the central axis A5 and tangent to a lower portion of an imaginary circle C5 defined by the radius of the annular sidewall-bottom transition portion 513. The upper end of the pierce hole 509 is also disposed is above the upper radius line plane RL12 bounding the annular sidewall-bottom transition portion 513.

Figure 20:
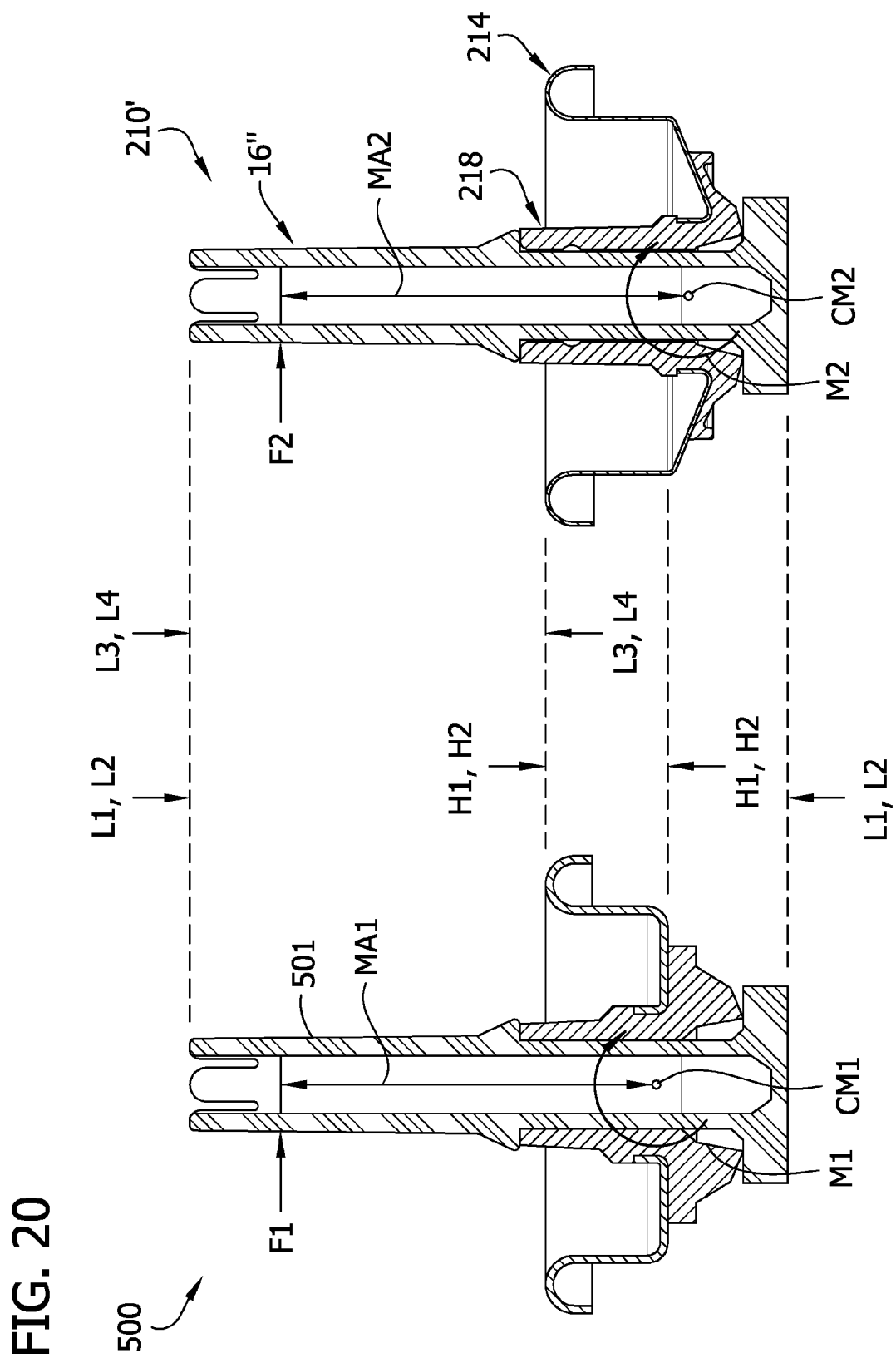
FIG. 20 is a comparison of the conventional valve of FIG. 19 and the present valve of FIG. 10.
Figure 21:
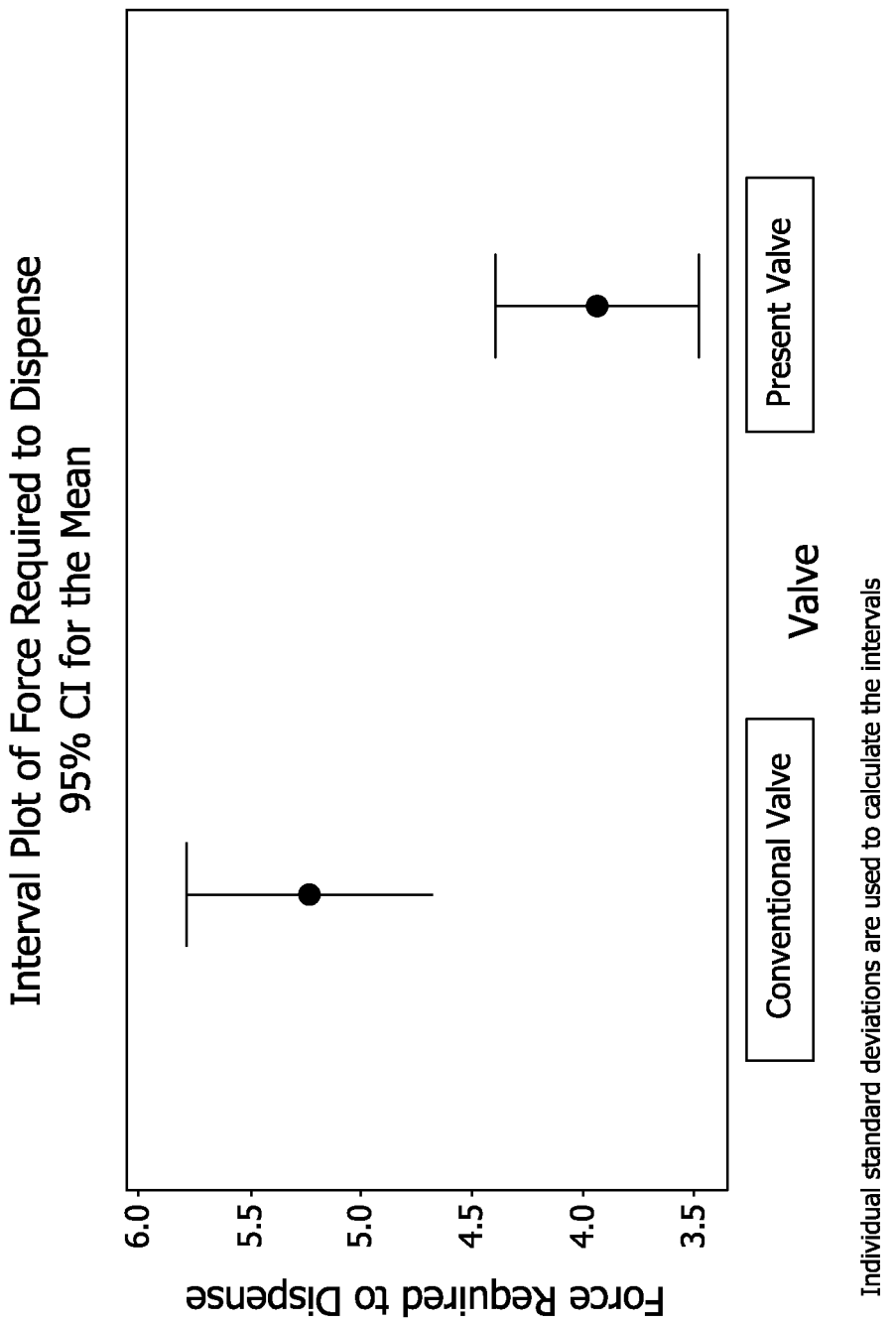
FIG. 21 is a graph comparing force necessary to dispense product using the conventional valve of FIG. 19 and the present valve of FIG. 10.

Referring to FIG. 20, a side-by-side comparison of the conventional valve 500 of FIG. 19 and a valve 210' of the present disclosure is illustrated. The valve 210' includes the mounting cup 214 and seal 218 of the valve 210 of FIG. 10. A stem 16" is different than the stem 16 of the valve 210. The stem 16" is identical to the stem 501 of the conventional valve 500. The valve 210' is shown for illustrative purposes with the understanding that each of the valve embodiments disclosed above herein provides the same advantage over the conventional valve 500, as set forth below. FIG. 20 illustrates the moment arms MA1, MA2, the moments M1, M2, and the moment centers, CM1, CM2 (or rotational or pivot axes) of the respective valves 500, 210'. As can be seen in FIG. 20, in one or more embodiments, the moment arm MA2 of the present valve 210' is greater (i.e., longer) than the moment arm of the conventional valve 500. By having a greater moment arm MA2, the force F2 (i.e., tilt force) required to open the present valve 210 and dispense product therefrom is less than the force F1 (i.e., tilt force) required to open the conventional valve 500 and dispense product therefrom. Table 1 (below) shows the force required to open the conventional valve to dispense a product. Table 2 (below) shows the force required to open the present valve to dispense a product. FIG. 21 is a graph plotting the data from Tables 1 and 2.

TABLE 1

Conventional Valve of FIG. 19

|  | Tilt Force (lbf) | Deflection at Tilt Force (in) |
|---|---|---|
| Conventional Valve 1 | 5.15 | 0.23 |
| Conventional Valve 2 | 5.02 | 0.20 |
| Conventional Valve 3 | 5.26 | 0.22 |
| Conventional Valve 4 | 4.58 | 0.22 |
| Conventional Valve 5 | 4.09 | 0.20 |
| Conventional Valve 6 | 5.74 | 0.20 |
| Conventional Valve 7 | 6.01 | 0.27 |
| Conventional Valve | 5.89 | 0.28 |

TABLE 2

Present Valve of FIG. 20

|  | Tilt Force (lbf) | Deflection at Tilt Force (in) |
|---|---|---|
| Present Valve | 4.34 | 0.18 |
| Present Valve | 3.73 | 0.17 |
| Present Valve | 4.26 | 0.17 |
| Present Valve | 3.84 | 0.17 |
| Present Valve | 3.47 | 0.15 |

The present valve 210' has greater moment arm due to the fact that the moment center CM2 of the stem of the present valve is "lower" than the moment center CM1 of the stem of the conventional valve, which is due to the pierce hole of the present valve being "lower" than the pierce hole of the conventional valve. Thus, as can also be seen from FIG. 20, in one or more embodiments the lengths L1, L2 of the stems 501, 16" of the respective conventional valve 500 and the present valve 210' are substantially equal (in fact, the stems are identical). Moreover, in one or more embodiments, the distances L3, L4 that the stems 501, 16" extend above the upper portion of the corresponding cup are also substantially equal. Moreover still, the partial heights H1, H2 of the respective mounting cups 505, 214 from the upper surfaces to the lower radius line planes RL12, RL6 are substantially equal. Accordingly, certain dimensions of the valves 500, 210' are substantially the same so that the present valve can be interchangeably used in place of the conventional valve without the need to change the designs of container (e.g., aerosol can) and/or packaging, such as lids and boxes.

Figure 14:
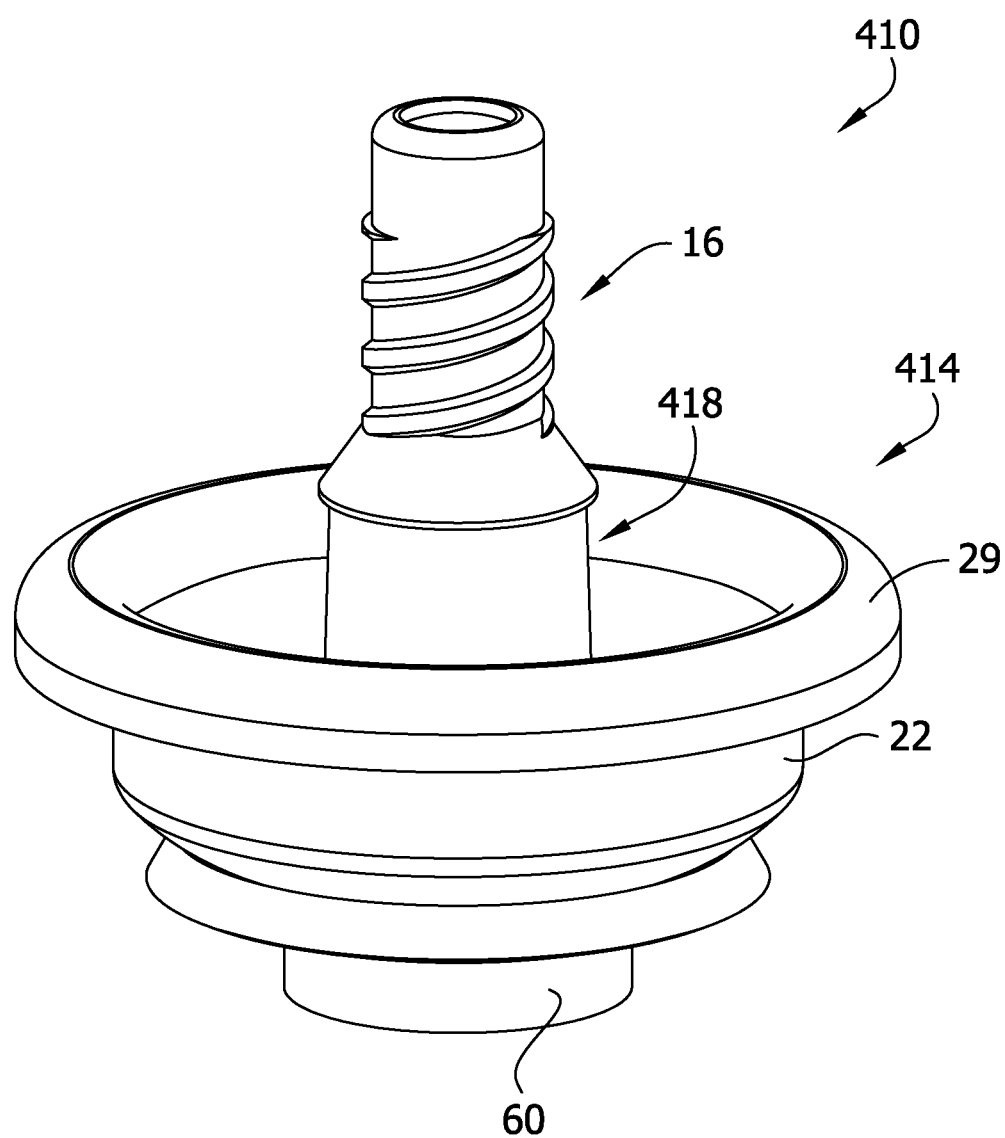
FIG. 14 is a perspective of a fifth embodiment of a valve.
Figure 15:
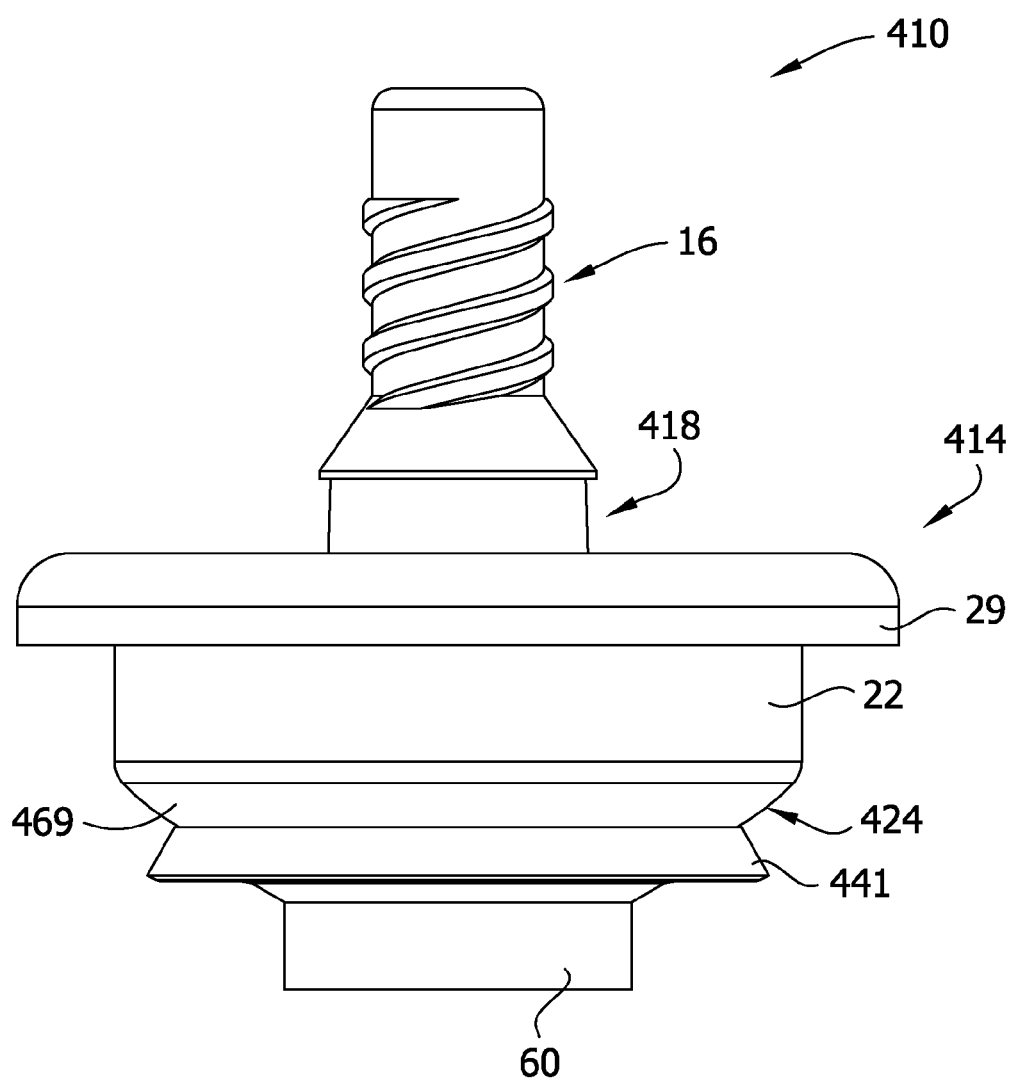
FIG. 15 is a front elevation of the fifth valve embodiment.
Figure 16:
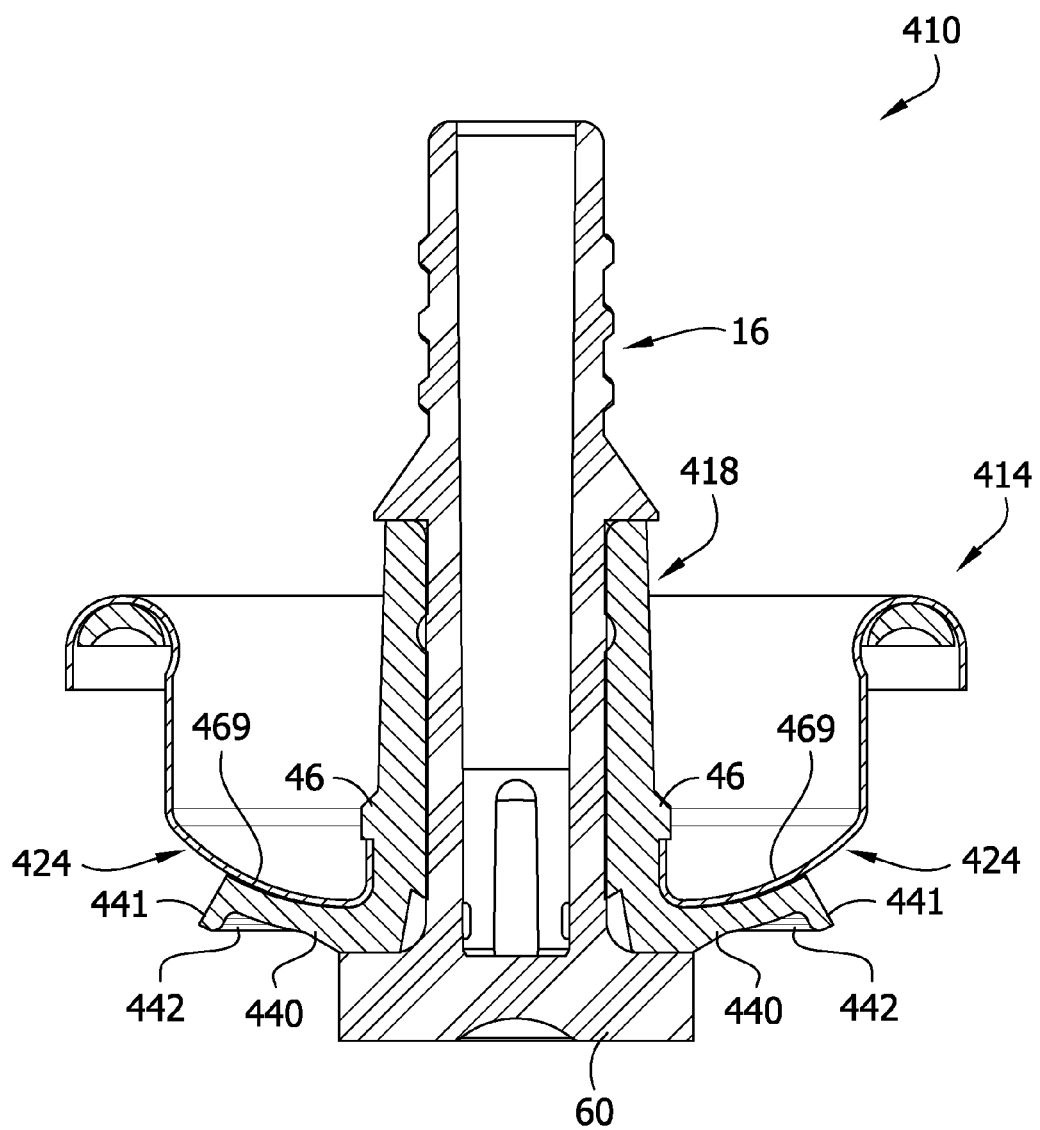
FIG. 16 is a cross section of the fifth valve embodiment.
Figure 22:
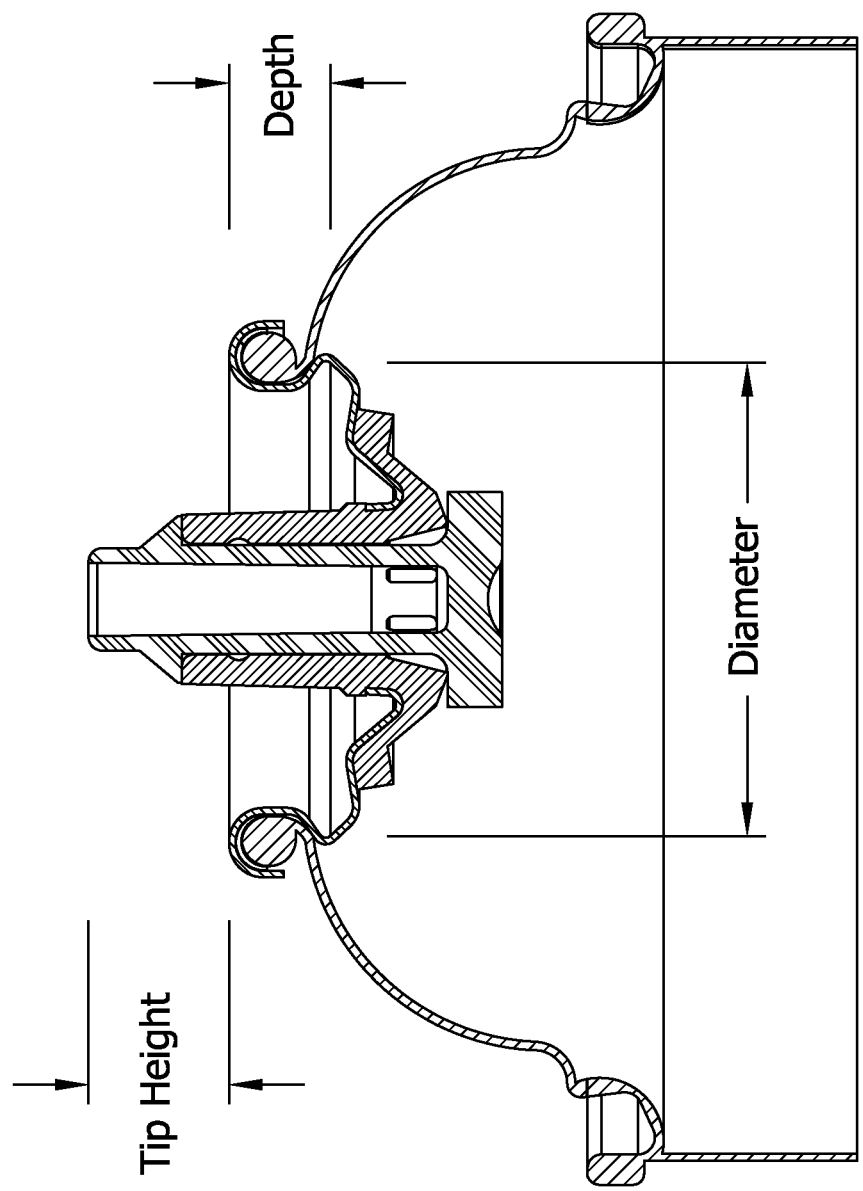
FIG. 22 shows the dimensions of valves after crimping.

Another advantage of the present valve, particularly the valve 410 shown in FIG. 14, compared to the conventional valve 500 is the decrease in the amount of "rise" of the present valve when crimping the valve to the container (e.g., aerosol can). Referring to FIG. 22, valves are typically crimped onto aerosol cans in order to create a seal between the can and the valve. During this crimping process the valve cup is deformed. This deformation of the valve cup causes the valve tip to change its position (generally known as "rise"). This can be an issue for valves used in packaging configurations that dock with the tip of the valve. One example of this is gun valves for one component polyurethane foam. Another example could be dispenser caps that connect with the tip of the valve.

As explained above the valve tip position is affected by the crimp. As the dimensions of the crimp are varied the tip position generally varies as well. Crimp dimensions are generally measured in depth from the top of the cup to the centerline of the crimp and diameter of the crimp as shown in FIG. 22. A typical crimp dimension would be specified as 0.205 in×1.055 in (5.207 mm×26.797 mm), which would be a depth of 0.205 in (5.207 mm) and a diameter of 1.055 in (26.797 mm).

Figure 23:
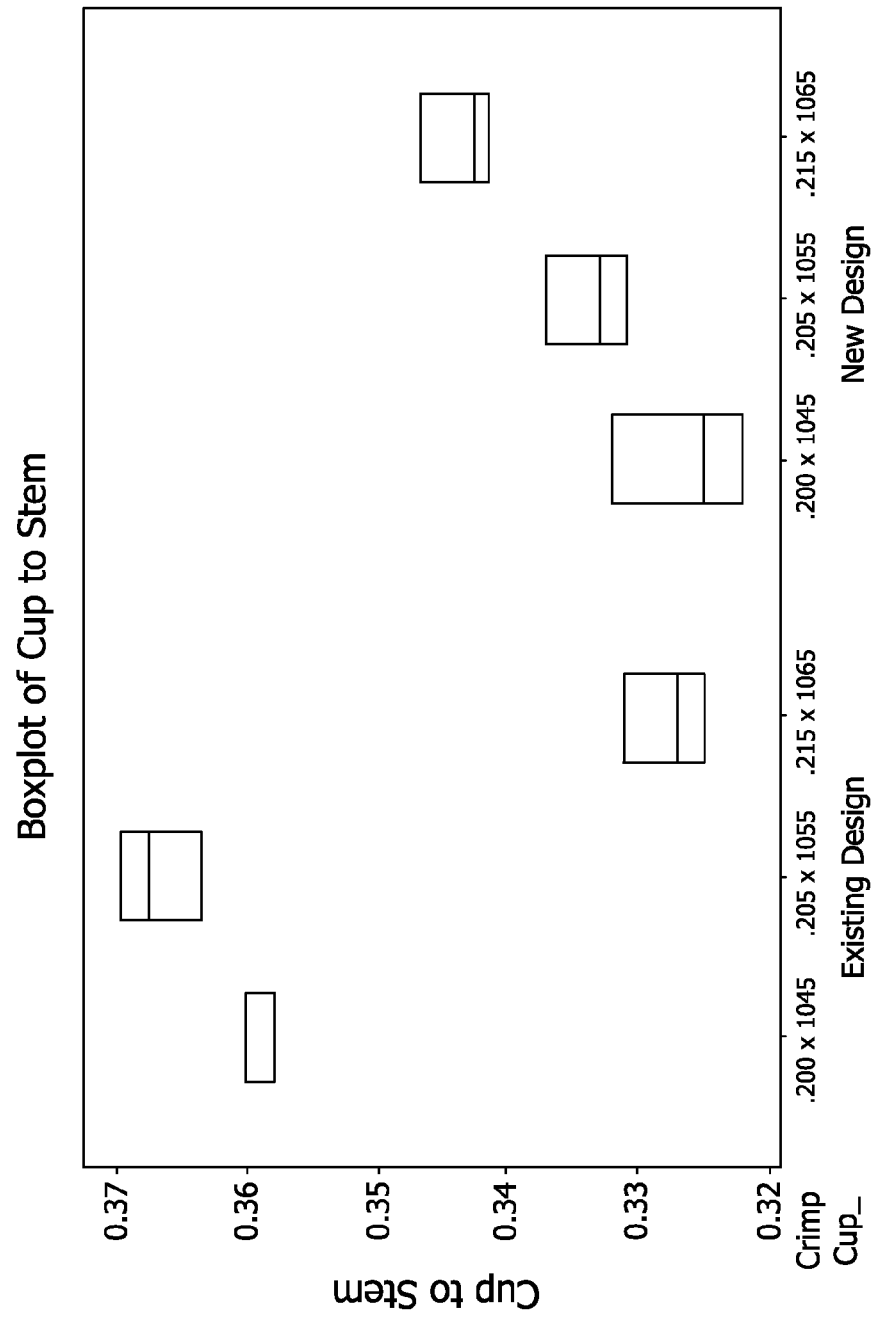
FIG. 23 is a graph comparing the variation in tip position of the conventional valve of FIG. 19 and the present valve of FIG. 14 at various crimp dimensions.

The present valve 410, more particularly the mounting cup 414 of the present valve, is less susceptible to variations in tip height caused by variation in crimp dimensions as compared to the conventional valve 500 of FIG. 19. That is, the variation in the tip position, after crimping, as a function of crimp depth and diameter is reduced as compared to the conventional valve 500 of FIG. 19. Table 3 includes data as to the tip position for various crimp dimensions for the conventional valve 500 and the present valve 410 illustrated in FIG. 14. FIG. 23 is a graph plotting the data in Table 3.

TABLE 3

Variation in Tip Position at Various Crimp Dimensions (inches).

|  | Before Gassing | | | After Gassing | | | After Collar | | | |
|---|---|---|---|---|---|---|---|---|---|---|
|  | Chime to Cup | Chime to Stem | Cup to Stem | Chime to Cup | Chime to Stem | Cup to Step | Chime to Stem | Chime to Collar | Collar to Stem | Gun Opening |
| Present Cup Crimps Depth .200 DIA. 1.045 | | | | | | | | | | |
| 1 | 0.8365 | 1.1690 | 0.3320 | 0.8440 | 1.1970 | 0.3520 | 1.1970 | 1.1025 | −0.0555 | 0.0460 |
| 2 | 0.8415 | 1.1665 | 0.3250 | 0.8490 | 1.1970 | 0.3470 | 1.1945 | 1.1030 | −0.0550 | 0.0500 |
| 3 | 0.8370 | 1.1705 | 0.3220 | 0.8450 | 1.1950 | 0.3500 | 1.1980 | 1.1070 | −0.0590 | 0.0450 |
| Min | 0.8365 | 1.1665 | 0.3220 | 0.8440 | 1.1950 | 0.3470 | 1.1945 | 1.1025 | −0.0590 | 0.0450 |
| Max | 0.8415 | 1.1705 | 0.3320 | 0.8490 | 1.1970 | 0.3520 | 1.1980 | 1.1070 | −0.0550 | 0.0500 |
| Avg | 0.8383 | 1.1687 | 0.3263 | 0.8460 | 1.1963 | 0.3497 | 1.1965 | 1.1042 | −0.0565 | 0.0470 |
| Present Cup Crimps Depth .205 DIA. 1.055 | | | | | | | | | | |
| 1 | 0.8370 | 1.1675 | 0.3310 | 0.8450 | 1.2020 | 0.3565 | 1.2025 | 1.1030 | −0.0500 | 0.0520 |
| 2 | 0.8390 | 1.1735 | 0.3330 | 0.8480 | 1.2060 | 0.3575 | 1.2080 | 1.1070 | −0.0495 | 0.0520 |
| 3 | 0.8370 | 1.1740 | 0.3370 | 0.8455 | 1.2115 | 0.3655 | 1.2130 | 1.1030 | −0.0400 | 0.0640 |
| Min | 0.8370 | 1.1675 | 0.3310 | 0.8450 | 1.2020 | 0.3565 | 1.2025 | 1.1030 | −0.0500 | 0.0520 |
| Max | 0.8390 | 1.1740 | 0.3370 | 0.8480 | 1.2115 | 0.3655 | 1.2130 | 1.1070 | −0.0400 | 0.0640 |
| Avg | 0.8377 | 1.1717 | 0.3337 | 0.8462 | 1.2065 | 0.3598 | 1.2078 | 1.1043 | −0.0465 | 0.0560 |
| Conventional Cup Crimps Depth .200 DIA. 1.045 | | | | | | | | | | |

TABLE 3-continued

Variation in Tip Position at Various Crimp Dimensions (inches).

| | Before Gassing | | | After Gassing | | | After Collar | | | |
|---|---|---|---|---|---|---|---|---|---|---|
| | Chime to Cup | Chime to Stem | Cup to Stem | Chime to Cup | Chime to Stem | Cup to Step | Chime to Stem | Chime to Collar | Collar to Stem | Gun Opening |
| 1 | 0.870 | 1.229 | 0.360 | 0.876 | 1.248 | 0.372 | 1.219 | 1.118 | −0.049 | 0.055 |
| 2 | 0.869 | 0.228 | 0.358 | 0.875 | 1.248 | 0.372 | 1.219 | 1.117 | −0.048 | 0.056 |
| 3 | 0.867 | 1.225 | 0.358 | 0.875 | 1.249 | 0.375 | 1.225 | 1.119 | −0.044 | 0.061 |
| Min | 0.867 | 0.228 | 0.358 | 0.875 | 1.248 | 0.372 | 1.219 | 1.117 | −0.049 | 0.055 |
| Max | 0.870 | 1.229 | 0.360 | 0.876 | 1.249 | 0.375 | 1.225 | 1.119 | −0.044 | 0.061 |
| Avg | 0.869 | 0.894 | 0.359 | 0.875 | 1.248 | 0.373 | 1.221 | 1.118 | −0.047 | 0.057 |
| | Conventional Cup Crimps Depth .205 DIA. 1.055 | | | | | | | | | |
| 1 | 0.8665 | 1.2355 | 0.3675 | 0.8745 | 1.2580 | 0.3850 | 1.2340 | 1.1280 | −0.0440 | 0.0600 |
| 2 | 0.8760 | 1.2395 | 0.3635 | 0.8820 | 1.2630 | 0.3800 | 1.2360 | 1.1320 | −0.0470 | 0.0570 |
| 3 | 0.8695 | 1.2400 | 0.3695 | 0.8750 | 1.2605 | 0.3845 | 1.2320 | 1.1230 | −0.0410 | 0.0580 |
| Min | 0.8665 | 1.2355 | 0.3635 | 0.8745 | 1.2580 | 0.3800 | 1.2320 | 1.1230 | −0.0470 | 0.0570 |
| Max | 0.8760 | 1.2400 | 0.3695 | 0.8820 | 1.2630 | 0.3850 | 1.2360 | 1.1320 | −0.0410 | 0.0600 |
| Avg | 0.8707 | 1.2383 | 0.3668 | 0.8772 | 1.2605 | 0.3832 | 1.2340 | 1.1277 | −0.0440 | 0.0583 |

In addition, in any of the above embodiments of the present valve, the mounting cup may be formed from sheet metal having a thickness of less than 0.016 in (0.406 mm) and greater than or equal to 0.005 in (0.127 mm). The sheet metal may be steel or other metal material. For example, the valve 410 of FIG. 14 may be formed from steel sheet metal having a thickness of about 0.010 in (0.254 mm), such that the mounting cup 414 resists deformation and does not significantly deform in use under a pressure of at least about 180 psi.

Figure 24:
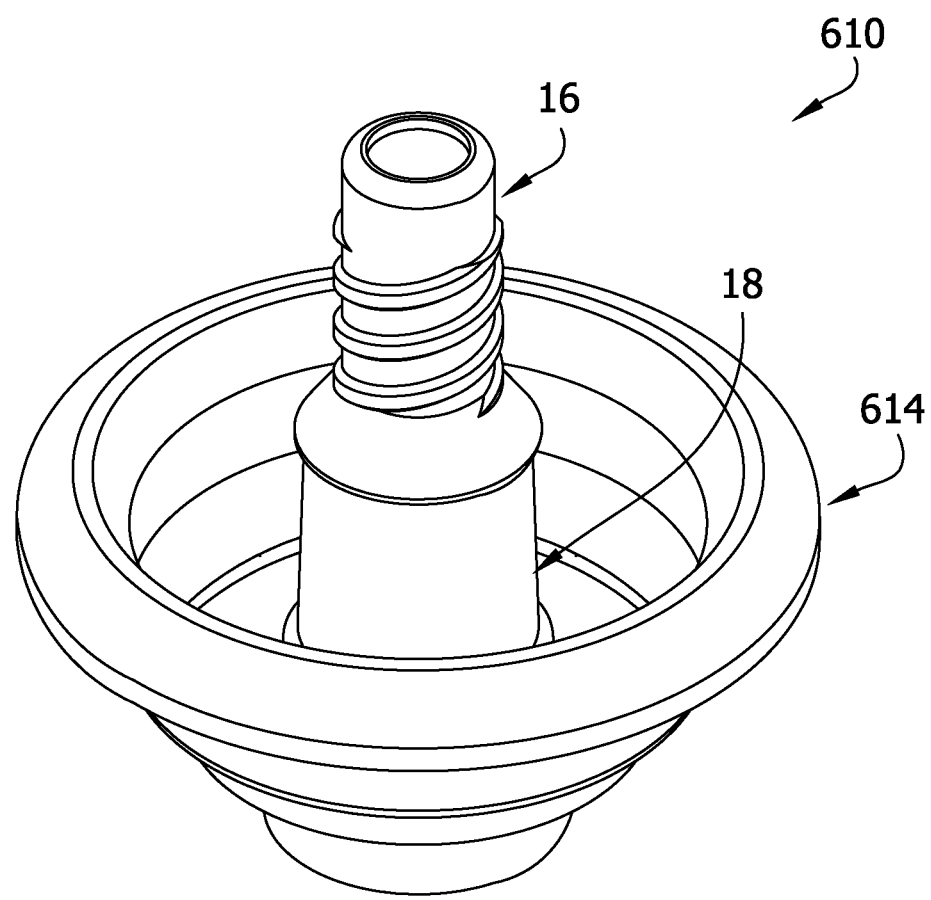
FIG. 24 is a perspective of a seventh valve embodiment.
Figure 25:
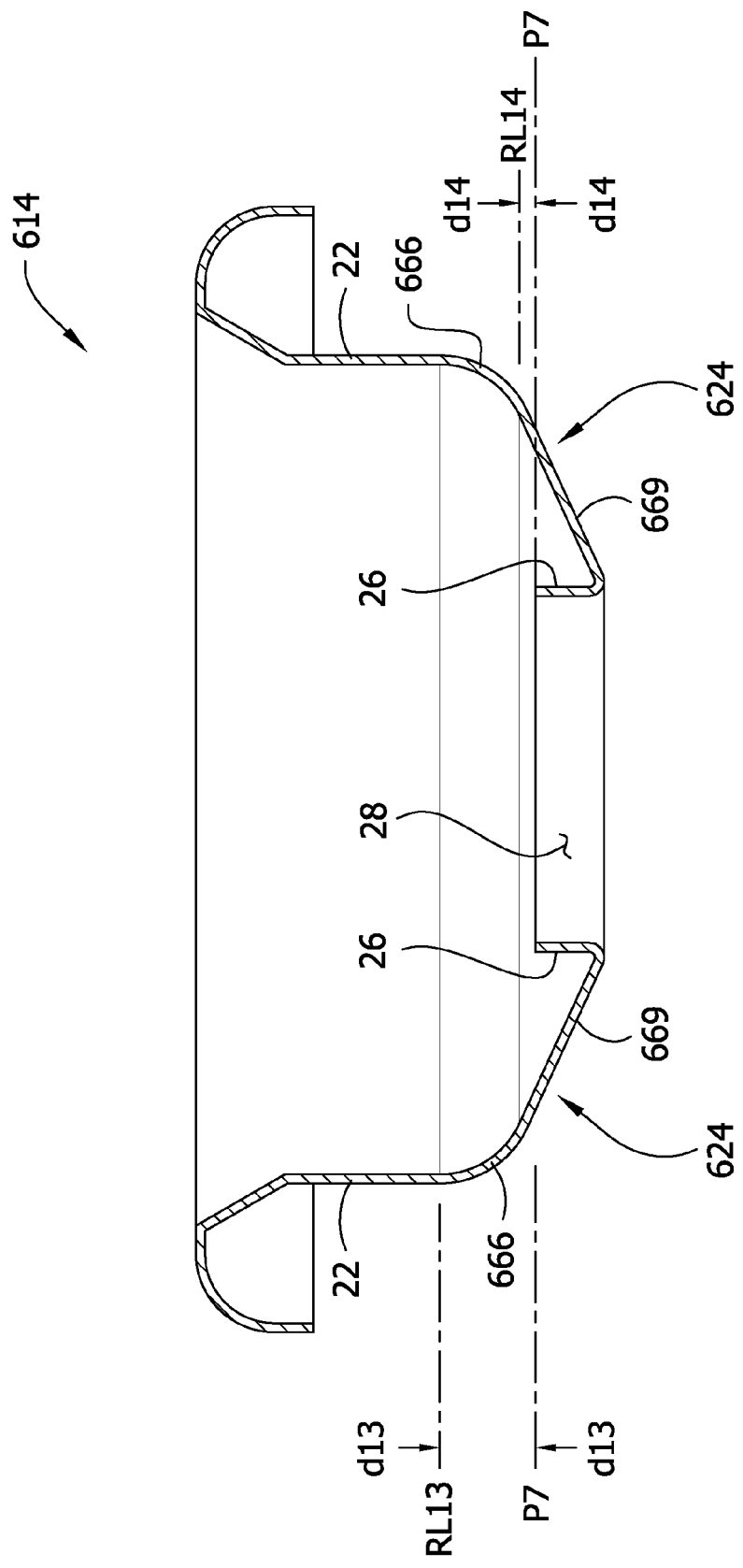
FIG. 25 is an enlarged cross section of a mounting cup of the seventh valve embodiment.

Referring to FIGS. 24 and 25, another embodiment of a valve constructed according to the teachings of the present disclosure is generally indicated at reference numeral 610. This valve 610 is similar to the third valve 210, with differences between the valves being disclosed below. Identical components and structures are indicated by corresponding reference numerals, and similar, but not identical, components and structures are indicated by corresponding reference numerals plus 400. Unless otherwise indicated, the teachings and disclosure set forth above with respect to the third valve 210 apply equally to the present valve 610. The valve stem 16 and the seal 18 are identical to the stem and seal of the third valve 210.

Referring to FIG. 25, the main difference between the present valve 610 and the third valve 210 is the mounting cup 614, and more specifically, the bottom wall 624. The annular sidewall-bottom transition portion 666 has a greater radius of curvature compared to the annular sidewall-bottom transition portion 266. The radial portion 669 has a constant slope like the third valve 210.

In one embodiment, the upper end of the central portion 26 defining the opening 28 (e.g., the end of the central portion that is engaged by the external seal bead in the illustrated embodiment lies in a plane P7) is at (e.g., coplanar with) or below (e.g., entirely below) the upper radius line plane RL13. In one or more embodiments, the upper end of the central portion 26 defining the opening 28 (e.g., the end of the central portion that is engaged by the external seal bead in the illustrated embodiment lies in a plane P7) is at (e.g., coplanar with) or below (e.g., entirely below) the lower radius line plane RL14. In the illustrated embodiment, the upper end of the central portion 26 defining the opening 28 is below both the upper radius line plane RL13 and the lower radius line plane RL14.

In one or more embodiments, a distance d13 between the upper radius line plane RL13 and the plane P7 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d14 between the lower radius line plane RL14 and the plane P7 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Figure 26:
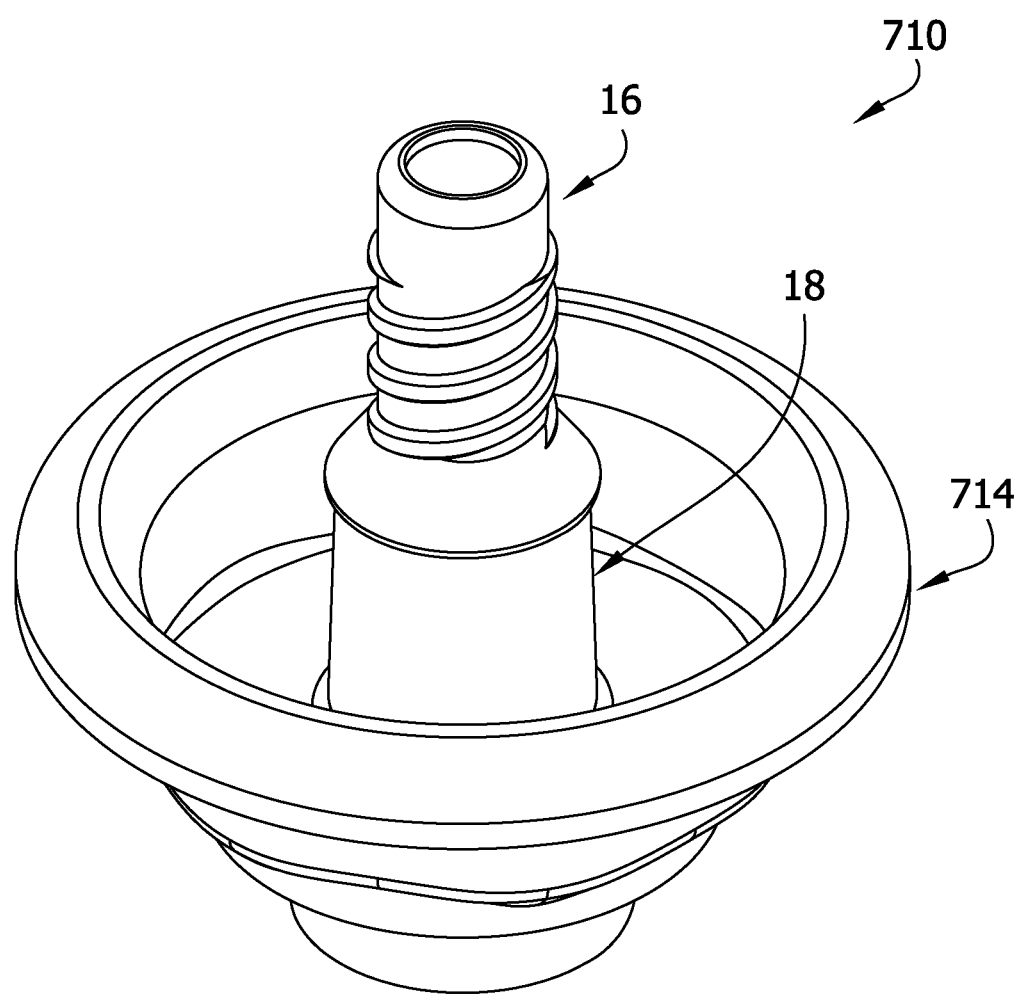
FIG. 26 is a perspective of an eighth valve embodiment.
Figure 27:
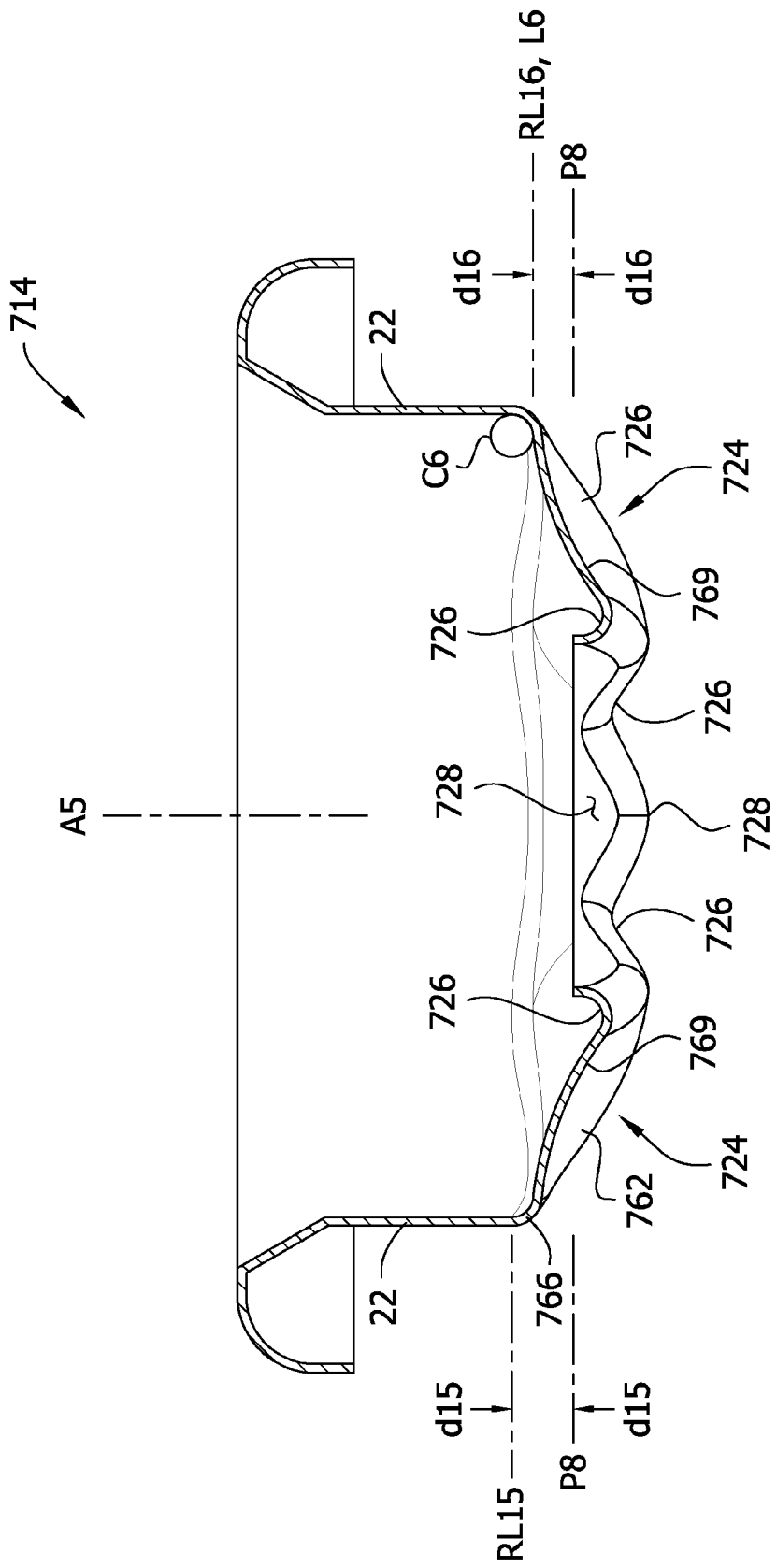
FIG. 27 is an enlarged cross section of a mounting cup of the eighth valve embodiment taken in a plane including opposite concave radial portions of a bottom wall of the mounting cup.
Figure 28:
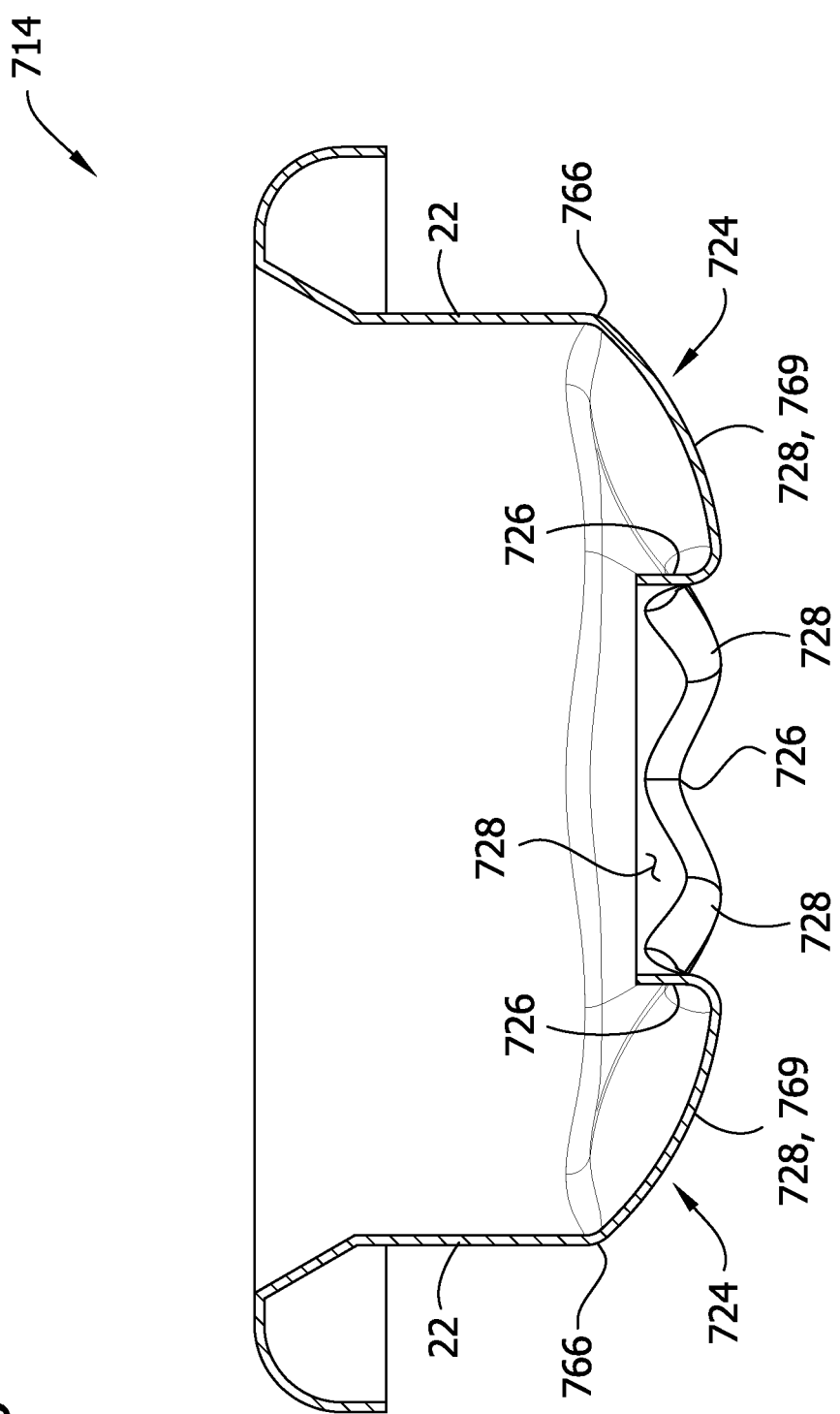
FIG. 28 is an enlarged cross section of the mounting cup of the eighth valve embodiment taken in a plane including opposite convex radial portions of a bottom wall of the mounting cup.

Referring to FIGS. 26-28, another embodiment of a valve constructed according to the teachings of the present disclosure is generally indicated at reference numeral 710. This valve 710 is similar to the third valve 210, with differences between the valves being disclosed below. Identical components and structures are indicated by corresponding reference numerals, and similar, but not identical, components and structures are indicated by corresponding reference numerals plus 500. Unless otherwise indicated, the teachings and disclosure set forth above with respect to the third valve 210 apply equally to the present valve 710. The valve stem 16 and the seal 18 are identical to the stem and seal of the third valve 210.

Referring to FIGS. 26 and 27, the main difference between the present valve 610 and the third valve 210 is the mounting cup 714, and more specifically, the bottom wall 724. The bottom wall 724 has alternating concave radial segments 726 (e.g., grooves) and convex radial segments 728 (e.g., ridges), such that the radial portion 769 is corrugated with a plurality of radial folds. A sectional view taken through opposite concave radial segments 726 is illustrated in FIG. 27, and a sectional view taken through opposite convex radial segments 728 is illustrated in FIG. 28. It is believed the corrugated bottom wall 725 increases the rigidity to the bottom wall.

Referring still to FIG. 27, in one embodiment, the upper end of the central portion 726 defining the opening 728 (e.g., the end of the central portion that is engaged by the external seal bead in the illustrated embodiment lies in a plane P8) is at (e.g., coplanar with) or below (e.g., entirely below) the upper radius line plane RL15. In one or more embodiments, the upper end of the central portion 726 defining the opening 728 (e.g., the end of the central portion that is engaged by the external seal bead in the illustrated embodiment lies in a plane P8) is at (e.g., coplanar with) or below (e.g., entirely below) the lower radius line plane RL16. In one or more embodiments, the upper end of the central portion 726 defining the opening 728 (e.g., the end of the central portion that is engaged by the external seal bead in the illustrated embodiment lies in a plane P8) is at (e.g., coplanar with) or below (e.g., entirely below) an imaginary line L6 perpendicular to the central axis A5 and tangent to a lower portion of an imaginary circle C6 defined by the radius of the annular sidewall-bottom transition portion 766. In the illustrated embodiment shown in FIG. 27, the imaginary line L6 and the lower radius line plane RL16 are coplanar, although in other embodiments, the imaginary line L6 and the lower radius line may not be coplanar (i.e., spaced apart along the axis A5). In the illustrated embodiment shown in FIG. 27, the plane P8 is below (e.g., entirely below) the line L6 and lower radius line plane RL16.

In one or more embodiments, a distance d15 between the upper radius line plane RL15 and the plane P8 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm. In one or more embodiments, a distance d16 between the imaginary line L6 (and the lower radius line plane RL16) and the plane P8 may be from about 0.0 mm to about 25.0 mm, or from about 0.25 mm to about 10.0 mm, or from about 0.25 mm to about 2.0 mm, or from about 0.1 mm to about 2.5 mm, or about 1.0 mm, or about 0.50 mm.

Figure 29:
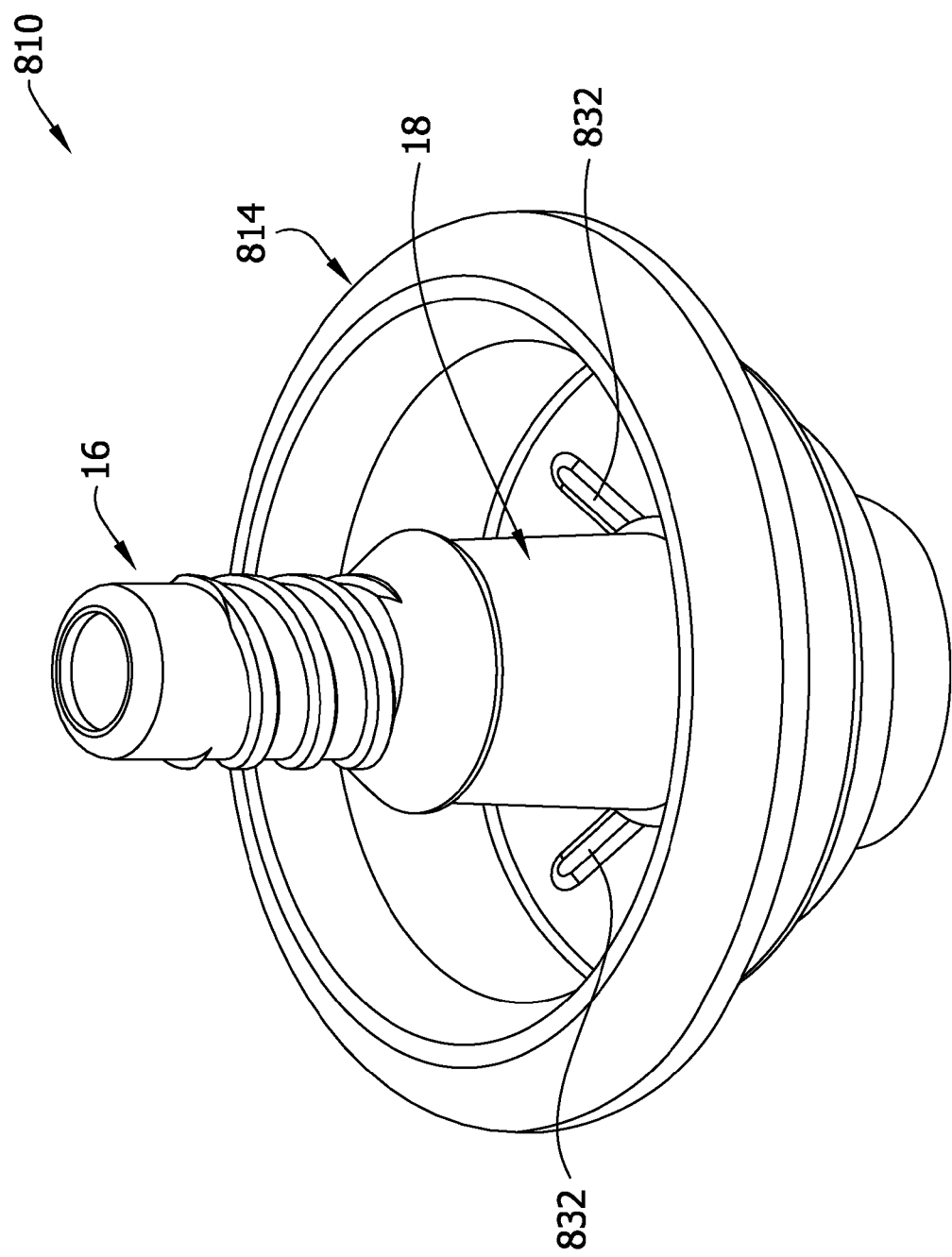
FIG. 29 is a perspective of an ninth valve embodiment.
Figure 30:
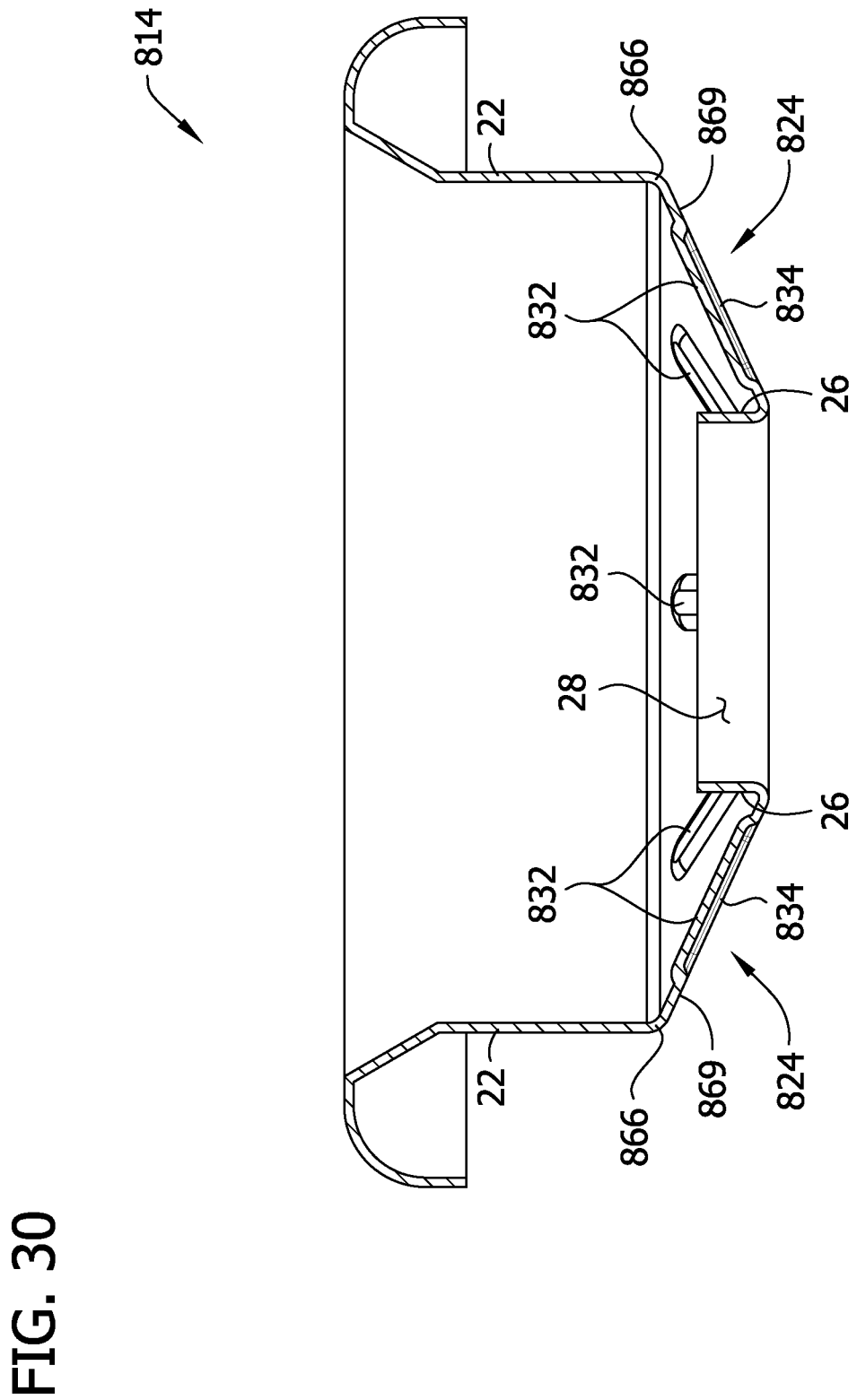
FIG. 30 is an enlarged cross section of a mounting cup of the ninth valve embodiment.

Referring to FIGS. 29 and 30, another embodiment of a valve constructed according to the teachings of the present disclosure is generally indicated at reference numeral 810. This valve 810 is similar to the third valve 210, with differences between the valves being disclosed below. Identical components and structures are indicated by corresponding reference numerals, and similar, but not identical, components and structures are indicated by corresponding reference numerals plus 600. Unless otherwise indicated, the teachings and disclosure set forth above with respect to the third valve 210 apply equally to the present valve 810. The valve stem 16 and the seal 18 are identical to the stem and seal of the third valve 210.

Referring to FIG. 30, the main difference between the present valve 810 and the third valve 210 is the mounting cup 814, and more specifically, the bottom wall 824. The bottom wall 824 has a plurality of ribs 832 formed on the bottom wall 824, more specifically, the inner radial portion 869 of the bottom wall. In the illustrated embodiment, the ribs 832 project upward from the inner radial portion 869 and corresponding grooves 834 are formed on the underside of the inner radial portion. In other embodiments the ribs may project downward and corresponding grooves may be formed on the upper side of the inner radial portion. The ribs 832 are spaced apart from one another around the inner radial portion 869. It is believe that the ribs 832 increase the rigidity of the bottom wall 824. The other features and components of the mounting cup 814 may be identical to the mounting cup 214, and the description of the mounting cup 214 set forth above applies equally to the present mounting cup 814.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A valve for dispensing flowable product from a container, the valve comprising:
a stem including a stem body defining a passage therein, and a disc at a lower portion of the stem body;
a seal attached to the stem body, the seal including a neck surrounding at least a longitudinal portion of the stem body, and an external seal bead extending laterally outward from the neck;
a mounting cup configured to mount the valve to the container, the mounting cup including
an annular sidewall having upper and lower ends and defining a central axis of the mounting cup,
a bottom wall extending radially inward from adjacent the lower end of the sidewall toward the central axis of the mounting cup,
an annular sidewall-bottom transition portion interposed between the lower end of the sidewall and an outer peripheral edge of the bottom wall, the annular sidewall-bottom transition portion having a radius,
wherein the bottom wall has a central portion defining a seal-mounting opening through which the seal and the stem extend, the external seal bead overlying an upper end of the central portion,
wherein the upper end of the central portion is disposed at or below a location that is about 0.040 in (1.016 mm) above an imaginary line perpendicular to the central axis of the mounting cup and tangent to a lower portion of an imaginary circle defined by the radius of the annular sidewall-bottom transition portion.

2. The valve set forth in claim 1, wherein the bottom wall of the mounting cup has an annular outer radial portion extending inward from the annular sidewall-bottom transition portion, and an annular inner radial portion interposed radially between the outer radial portion and the central portion of the bottom wall wherein the annular inner radial portion extends downward from the outer radial portion of the bottom wall.

3. The valve set forth in claim 2, wherein the outer radial portion of the bottom wall lies substantially within an orthogonal plane that is generally orthogonal to the central axis of the mounting cup.

4. The valve set forth in claim 3, wherein the inner radial portion of the bottom wall of the mounting cup extends at an angle between 0 degrees and 90 degrees relative to a plane orthogonal to the central axis of the mounting cup.

5. The valve set forth in claim 3, wherein the inner radial portion of the bottom wall of the mounting cup extends at an acute angle relative to a plane orthogonal to the central axis of the mounting cup.

6. The valve set forth in claim 5, wherein the inner radial portion of the bottom wall of the mounting cup extends at the acute angle measuring from about 10 degrees to about 80 degrees relative to the central axis of the mounting cup.

7. The valve set forth in claim 1, wherein the seal includes an annular flange disposed below and in sealing engagement with the inner radial portion of the bottom wall of the mounting cup, the annular flange extending at an acute angle relative to the central axis of the mounting cup.

8. The valve set forth in claim 1, wherein the seal is a molded, one-piece construction, the seal comprising a thermoplastic elastomer.

9. The valve set forth in claim 1, wherein the seal is a vulcanized rubber.

10. The valve set forth in claim 1, wherein the upper end of the central portion of the bottom wall is generally coplanar with or below said imaginary line.

11. The valve set forth in claim 10, wherein the upper end of the central portion of the bottom wall is disposed below said imaginary line.

12. The valve set forth in claim 10, wherein the upper end of the central portion of the bottom wall is generally coplanar with said imaginary line.

13. The valve set forth in claim 1, wherein the upper end of the central portion of the bottom wall is above said imaginary line.

14. A valve for dispensing flowable product from a container, the valve comprising:
   a stem including a stem body defining a passage therein, and a disc at a lower portion of the stem body;
   a seal attached to the stem body, the seal including a neck surrounding at least a longitudinal portion of the stem body, and an external seal bead extending laterally outward from the neck;
   a mounting cup configured to mount the valve to the container, the mounting cup including
      an annular sidewall having upper and lower ends and defining a central axis of the mounting cup,
      a bottom wall extending radially inward from adjacent the lower end of the sidewall toward the central axis of the mounting cup,
      an annular sidewall-bottom transition portion interposed between the lower end of the sidewall and an outer peripheral edge of the bottom wall, the annular sidewall-bottom transition portion having a radius and being bounded by an upper radius line defining an upper radius line plane transverse to the central axis and a lower radius line defining a lower radius line plane transverse to the central axis,
   wherein the bottom wall has a central portion defining a seal-mounting opening through which the seal and the stem extend, the external seal bead overlying an upper end of the central portion,
   wherein the upper end of the central portion is disposed at or below a location that is about 0.040 in (1.016 mm) above the lower radius line plane.

15. A valve for dispensing flowable product from a container, the valve comprising:
   a stem including a stem body defining a passage therein, and a disc at a lower portion of the stem body;
   a seal attached to the stem body, the seal including a neck surrounding at least a longitudinal portion of the stem body, and an external seal bead extending laterally outward from the neck;
   a mounting cup configured to mount the valve to the container, the mounting cup including
      an annular sidewall having upper and lower ends and defining a central axis of the mounting cup,
      a bottom wall extending radially inward from adjacent the lower end of the sidewall toward the central axis of the mounting cup,
      an annular sidewall-bottom transition portion interposed between the lower end of the sidewall and an outer peripheral edge of the bottom wall, the annular sidewall-bottom transition portion having a radius and being bounded by an upper radius line defining an upper radius line plane transverse to the central axis and a lower radius line defining a lower radius line plane transverse to the central axis,
   wherein the bottom wall has a central portion defining a seal-mounting opening through which the seal and the stem extend, the external seal bead overlying an upper end of the central portion,
   wherein the upper end of the central portion is disposed at or below the upper radius line plane.

16. A valve for dispensing flowable product from a container, the valve comprising:
   a stem including a stem body defining a passage therein, and a disc at a lower portion of the stem body;
   a seal attached to the stem body, the seal including a neck surrounding at least a longitudinal portion of the stem body, and an external seal bead extending laterally outward from the neck;
   a mounting cup configured to mount the valve to the container, the mounting cup including
      an annular sidewall having upper and lower ends and defining a central axis of the mounting cup,
      a bottom wall extending radially inward from adjacent the lower end of the sidewall toward the central axis of the mounting cup,
      an annular sidewall-bottom transition portion interposed between the lower end of the sidewall and an outer peripheral edge of the bottom wall, the annular sidewall-bottom transition portion having a radius and being bounded by an upper radius line defining an upper radius line plane transverse to the central axis and a lower radius line defining a lower radius line plane transverse to the central axis,
   wherein the bottom wall has a central portion defining a seal-mounting opening through which the seal and the stem extend, the external seal bead overlying an upper end of the central portion,
   wherein the upper end of the central portion is disposed at or below the lower radius line plane.

* * * * *